US009075140B2

(12) United States Patent
Garrison et al.

(10) Patent No.: US 9,075,140 B2
(45) Date of Patent: Jul. 7, 2015

(54) GNSS EPHEMERIS WITH GRACEFUL DEGRADATION AND MEASUREMENT FUSION

(75) Inventors: James Levi Garrison, Lafayette, IN (US); Michael Allen Walker, Newburgh, IN (US)

(73) Assignee: Purdue Research Foundation, West Lafayette, IN (US)

( * ) Notice: Subject to any disclaimer, the term of this patent is extended or adjusted under 35 U.S.C. 154(b) by 710 days.

(21) Appl. No.: 12/889,351

(22) Filed: Sep. 23, 2010

(65) Prior Publication Data
US 2011/0071808 A1    Mar. 24, 2011

Related U.S. Application Data

(60) Provisional application No. 61/245,139, filed on Sep. 23, 2009.

(51) Int. Cl.
*G01C 21/24* (2006.01)
*G01S 19/27* (2010.01)

(52) U.S. Cl.
CPC ..................... *G01S 19/27* (2013.01)

(58) Field of Classification Search
CPC ........................................ G01S 19/27
See application file for complete search history.

(56) References Cited

U.S. PATENT DOCUMENTS

| | | | | |
|---|---|---|---|---|
| 5,731,786 A * | 3/1998 | Abraham et al. | ......... | 342/357.25 |
| 5,731,787 A * | 3/1998 | Sheynblat | ................. | 342/357.24 |
| 5,935,196 A * | 8/1999 | Brodie et al. | .................. | 701/480 |
| 6,009,376 A * | 12/1999 | Brodie et al. | .................. | 701/480 |
| 6,049,304 A * | 4/2000 | Rudel et al. | ............... | 342/357.34 |
| 6,211,819 B1 * | 4/2001 | King et al. | ................. | 342/357.66 |
| 6,233,507 B1 * | 5/2001 | May | ................................ | 701/13 |
| 6,246,960 B1 * | 6/2001 | Lin | ................................. | 701/472 |
| 6,323,803 B1 * | 11/2001 | Jolley et al. | ............... | 342/357.42 |
| 6,411,892 B1 * | 6/2002 | van Diggelen | ................. | 701/471 |
| 6,429,811 B1 * | 8/2002 | Zhao et al. | ................. | 342/357.66 |
| 6,542,820 B2 * | 4/2003 | LaMance et al. | .............. | 701/478 |
| 6,560,534 B2 * | 5/2003 | Abraham et al. | ............. | 701/484 |

(Continued)

OTHER PUBLICATIONS

Moreau et al., GPS receiver architecture and expected performance for autonomous GPS navigation in highly eccentric orbits, Navigation, 2000, 47(3).

(Continued)

*Primary Examiner* — Jonathan L Sample
(74) *Attorney, Agent, or Firm* — Maginot, Moore & Beck LLP

(57) ABSTRACT

A method for providing an extended propagation ephemeris model for a satellite in Earth orbit, the method includes obtaining a satellite's orbital position over a first period of time, applying a least square estimation filter to determine coefficients defining osculating Keplarian orbital elements and harmonic perturbation parameters associated with a coordinate system defining an extended propagation ephemeris model that can be used to estimate the satellite's position during the first period, wherein the osculating Keplarian orbital elements include semi-major axis of the satellite (a), eccentricity of the satellite (e), inclination of the satellite (i), right ascension of ascending node of the satellite ($\Omega$), true anomaly ($\theta^*$), and argument of periapsis ($\omega$), applying the least square estimation filter to determine a dominant frequency of the true anomaly, and applying a Fourier transform to determine dominant frequencies of the harmonic perturbation parameters.

11 Claims, 21 Drawing Sheets

(56) References Cited

U.S. PATENT DOCUMENTS

| | | | |
|---|---|---|---|
| 6,651,000 B2* | 11/2003 | van Diggelen et al. | 701/484 |
| 7,142,157 B2* | 11/2006 | Garin et al. | 342/357.64 |
| 7,548,200 B2* | 6/2009 | Garin | 342/357.66 |
| 7,564,406 B2* | 7/2009 | Han | 342/357.66 |
| 7,969,356 B2* | 6/2011 | King et al. | 342/357.66 |
| 8,081,108 B2* | 12/2011 | Remondi et al. | 342/357.66 |
| 8,207,890 B2* | 6/2012 | Venkatraman et al. | 342/357.64 |
| 8,274,430 B2* | 9/2012 | Garin | 342/357.66 |
| 2003/0132878 A1* | 7/2003 | Devereux et al. | 342/357.06 |
| 2004/0006424 A1* | 1/2004 | Joyce et al. | 701/207 |
| 2005/0146461 A1* | 7/2005 | Pande et al. | 342/357.02 |
| 2007/0103364 A1* | 5/2007 | Garin et al. | 342/357.15 |
| 2007/0247354 A1* | 10/2007 | Garin | 342/357.03 |
| 2007/0260399 A1* | 11/2007 | Abraham et al. | 701/226 |
| 2007/0273581 A1* | 11/2007 | Garrison et al. | 342/357.03 |
| 2007/0299609 A1* | 12/2007 | Garin et al. | 701/226 |
| 2008/0018527 A1* | 1/2008 | LaMance et al. | 342/357.1 |
| 2008/0036654 A1* | 2/2008 | Hansen et al. | 342/357.12 |
| 2008/0111738 A1* | 5/2008 | Han | 342/357.12 |
| 2008/0186228 A1* | 8/2008 | Garin et al. | 342/357.12 |
| 2008/0246653 A1* | 10/2008 | Lin et al. | 342/357.06 |
| 2008/0303714 A1* | 12/2008 | Ezal et al. | 342/357.12 |
| 2009/0073039 A1* | 3/2009 | Rideout et al. | 342/357.12 |
| 2009/0237302 A1* | 9/2009 | Derbez et al. | 342/357.15 |
| 2010/0007555 A1* | 1/2010 | Ezal et al. | 342/357.12 |
| 2010/0060518 A1* | 3/2010 | Bar-Sever et al. | 342/357.12 |
| 2010/0085247 A1* | 4/2010 | Venkatraman et al. | 342/357.01 |
| 2010/0103041 A1* | 4/2010 | Tomita | 342/357.15 |
| 2010/0283681 A1* | 11/2010 | Remondi et al. | 342/357.66 |
| 2011/0071808 A1* | 3/2011 | Garrison et al. | 703/2 |
| 2011/0234456 A1* | 9/2011 | McBurney et al. | 342/357.42 |

OTHER PUBLICATIONS

Bamford et al., GPS navigation for the magnetospheric multiscale mission, ION GNSS Conference, 2009.

Keesey L., Navigator technology takes GPS to a new high.http://www.nasa.gov/topics/technology/features/navigator-gps.html, 2010.

Choi et al., A novel weak signal acquisition scheme for assisted GPS, ION GPS 2001: International Technical Meeting of the Satellite Division of the Institute of Navigation, Sep. 2002, 24-27.

Lin et al., An efficient weak signal acquisition algorithm for a software GPS receiver, ION GPS 2001, Sep. 2001, pp. 115-136.

Heckler et al., Implementation and testing of an unaided method for the acquisition of weak GPS c/a code signals, Navigation, 2009, 56(4).

Heckler et al., Experimental tests of unaided weak signal acquisition methods using a software receiver, ION GNSS, Sep. 2006.

Psiaki et al., Extended kalman filter methods for tracking weak gps signals, ION GPS 2002: 15th International Technical Meeting of the Satellite Division of The Institute of Navigation, Sep. 2002, 24-27.

Lin et al., A weak signal tracking technique for a standalone software gps receiver, ION GPS 2002, Sep. 2002, 24-27, Portland, OR.

Zidean et al., Extended kalman filter-based tracking of weak GPS signals under high dynamic conditions, ION GNSS, Sep. 2004.

Misra et al., Global Positioning System, Dunno, 2000.

Global positioning system standard positioning service performance standard, http://www.navcen.uscg.gov/pdf/gps/geninfo/2001SPSPerformanceStandardFINAL.pdf, 2001.

United States Naval Observatory, Block II satellite information, ftp://tycho.usno.navy.mil/pub/gps/gpsb2.txt, Aug. 2010.

Navstar global positioning system interface specification is-gps-200d, http://www.navcen.uscg.gov/pdf/IS-GPS-200D.pdf, 2004.

Winternitz et al., Navigator GPS receiver for fast acquisition and weak signal space applications, Institute of Navigation GNSS Conference, 2004.

Bramform et al., A GPS receiver for lunar missions, Date unknown.

Spilker Jr. et al., Global Positioning System: Theory and Applications, 1996, vol. 1. American Institute of Aeronautics and Astronautics Inc., 1 page.

Warren, Broadcast vs. precise GPS ephemerides: A historical perspective, 2003, GPS Solutions, 7:151-156.

Coffey et al.,Compression of satellite orbits. AAS/AIAA, Feb. 1996, Astrodynamics Specialist Conference, 96-125.

Mattos, Hot start every time, compute the ephemeris on the mobile, 2008.

Zhang et al., Sirf Instantfix II Technology, 2008, ION GNSS, International Technical Meeting of the Satellite Division 16-19.

Lee et al., Precise Ephemeris reconstruction using the clohessy-wiltshire frame and multiple sequential compressions. Journal of Guidance, Control and Dynamics, Sep. 2003, 26(5).

Jezewski, An ideal reference frame for perturbed orbital motion, Aug. 1988, AIAA/AAS Astrodynamics Conference.

Garrison et al., An Extended Propagation Ephemeris for GNSS Navigation, 2006, 53(3):167-181.

Roulston et al., An evaluation of various GPS satellite ephemerides, Sep. 2000, ION GPS 2000, 19-22.

Vallado, Fundamentals of Astrodynamics and Applications, 2001, Microcosm Press.

Roy, Orbital Motion, Date Unknown, Adam Hilger Ltd, Bristol, pp. 286-291.

Born et al., An analytical theory for orbit determination, 2001, The Journal of the Astronautical Sciences, 49(2), pp. 425-429.

International GNSS Service. Data and products. http://igscb.jpl.nasa.gov/components/compindex.html, last updated Jul. 2004.

Tasaki et al., Tdrss k-band ultra high data rate demonstration, 2008. AIAA Space-Ops Conference.

Yoaz et al., Nasa's Global Differential GPS System and the TDRSS Augmentation Service for Satellites, Date Unknown.

Rodrigues, Deep space network, 2009, NASA JPL Presentation.

AirMagnet Inc. 802.11n primer. 2008.

Ziedan et al., Bit Synchronization and Doppler Frequency Removal at Very Low Carrier to Noise Ratio Using a Combination of the Viterbi Algorithm with an Extended Kalman Filter, Sep. 2003, ION GPS/GNSS 2003, pp. 9-12.

Ziedan et al., Unaided Acquisition of Weak GPS Signals Using Circular Correlation or Double-Block Zero Padding, 2004, IEEE, pp. 461-470.

FCC Public Notice DA 99-2130, Oct. 8, 1999.

NASA JPL International GNSS Service, jgscb.jpl.nasa.gov, Date Unknown.

Tapley et al., Statistical Orbit Determination, Elsevier Academic Press, 2004, Burlington, Mass. pp. 172-191.

* cited by examiner

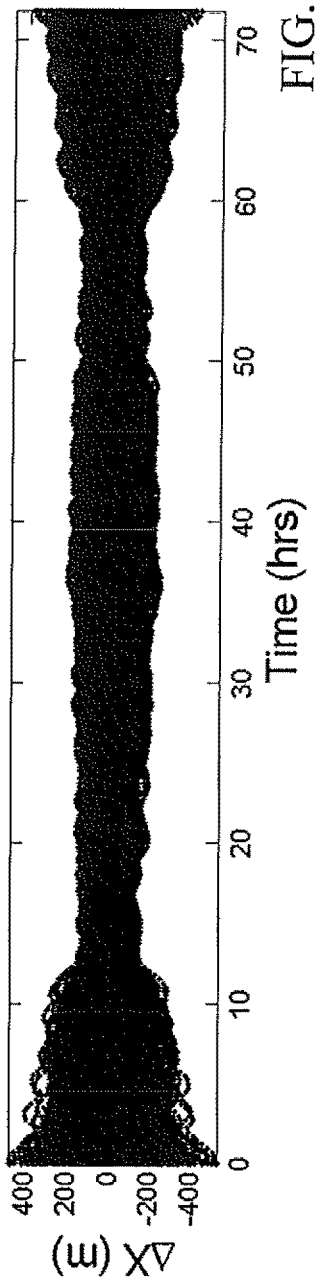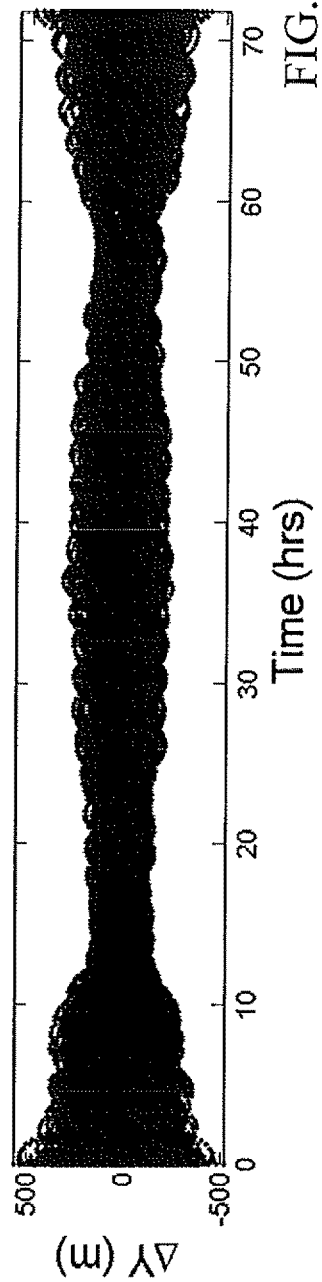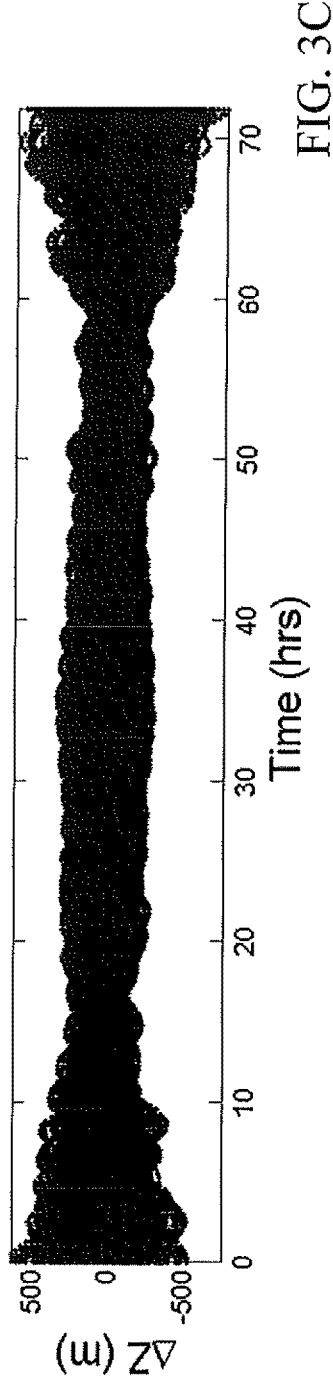
FIG. 3A
FIG. 3B
FIG. 3C

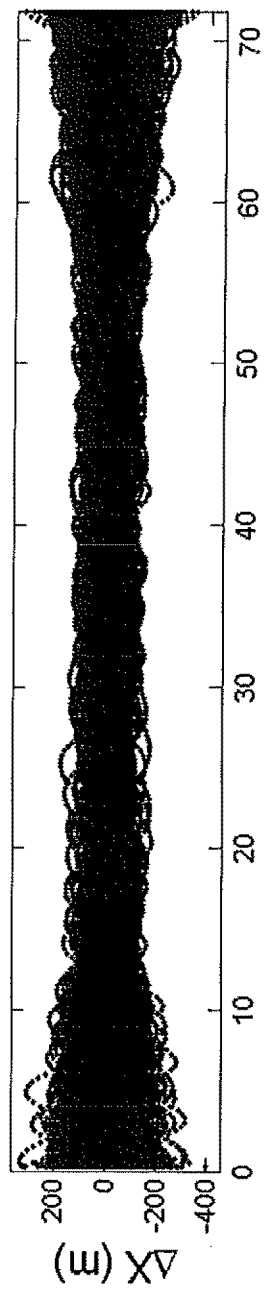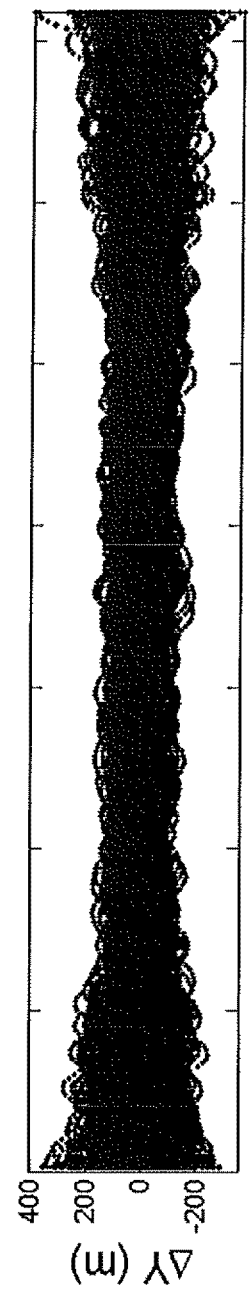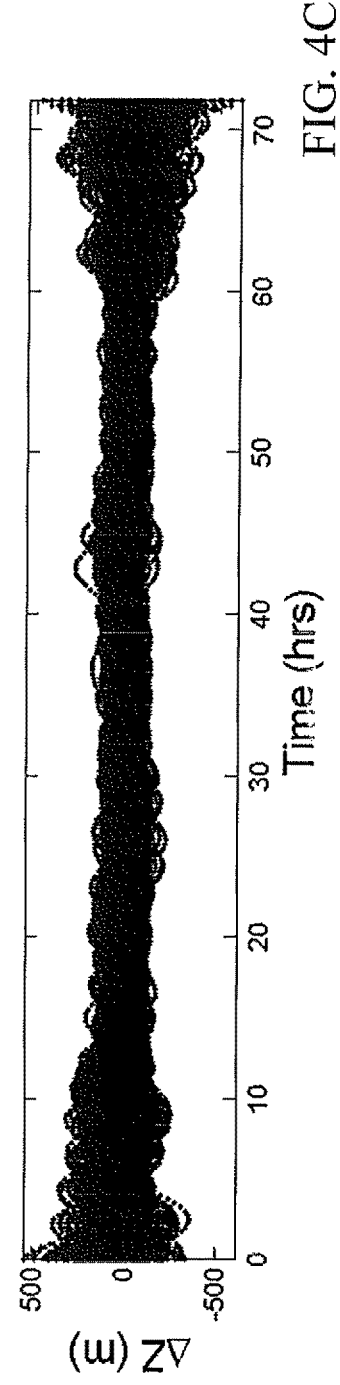
FIG. 4A
FIG. 4B
FIG. 4C

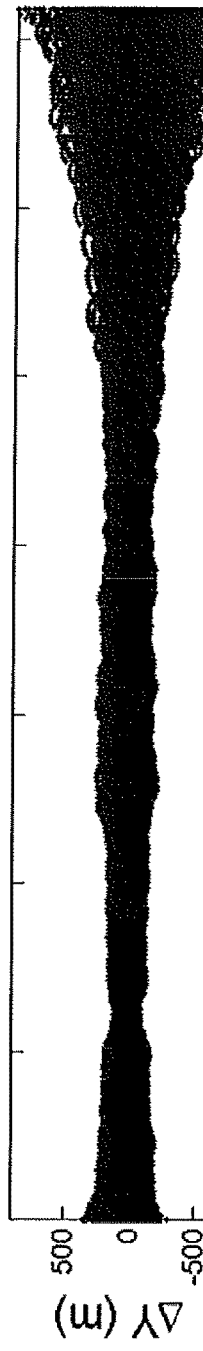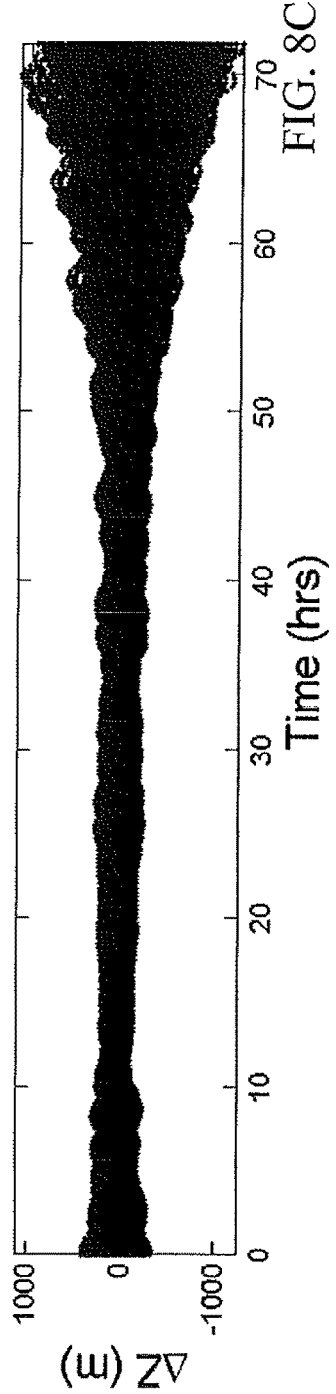
FIG. 8A
FIG. 8B
FIG. 8C

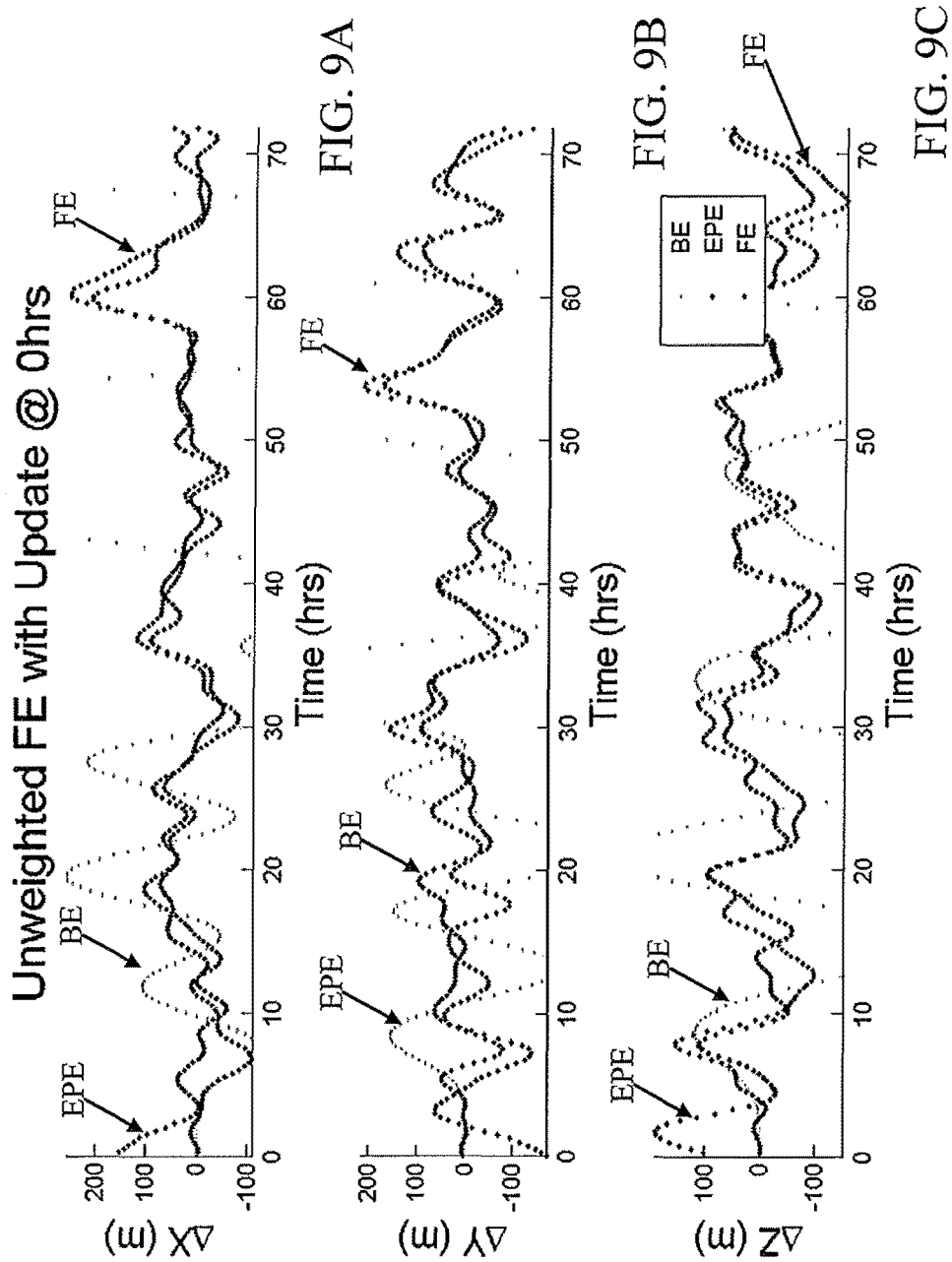

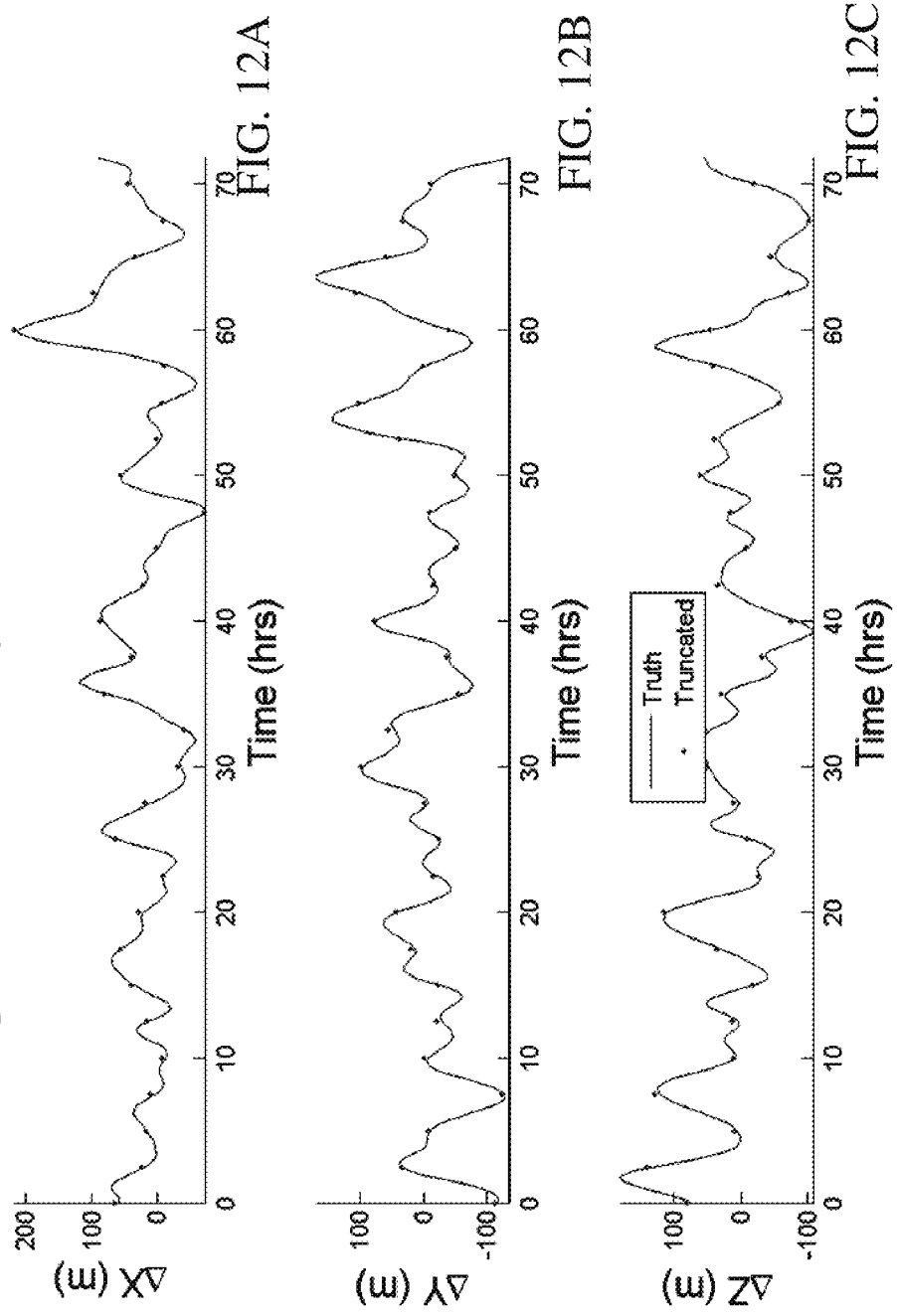

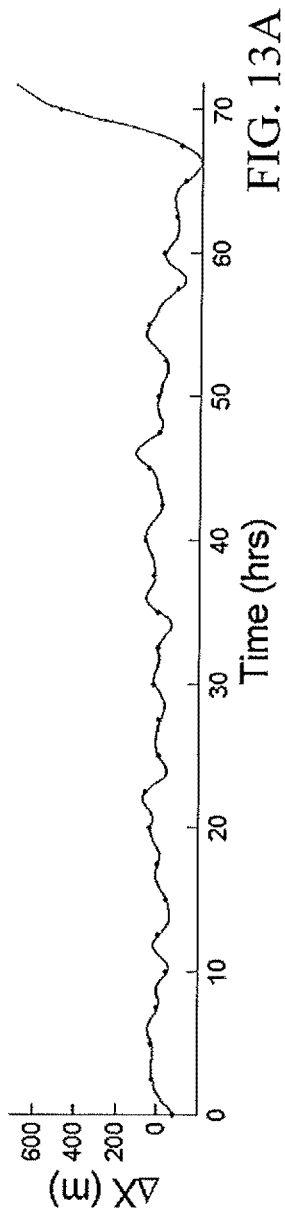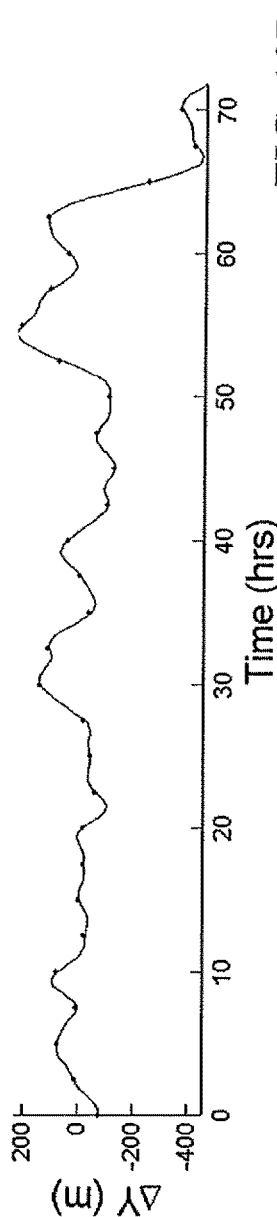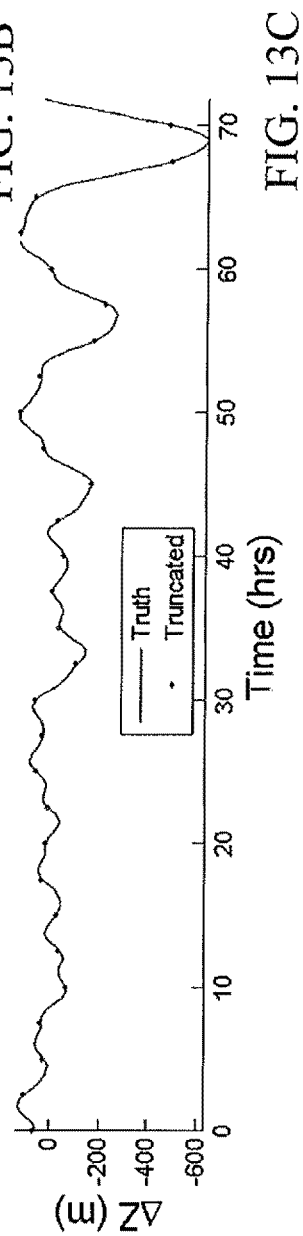
FIG. 13A
FIG. 13B
FIG. 13C

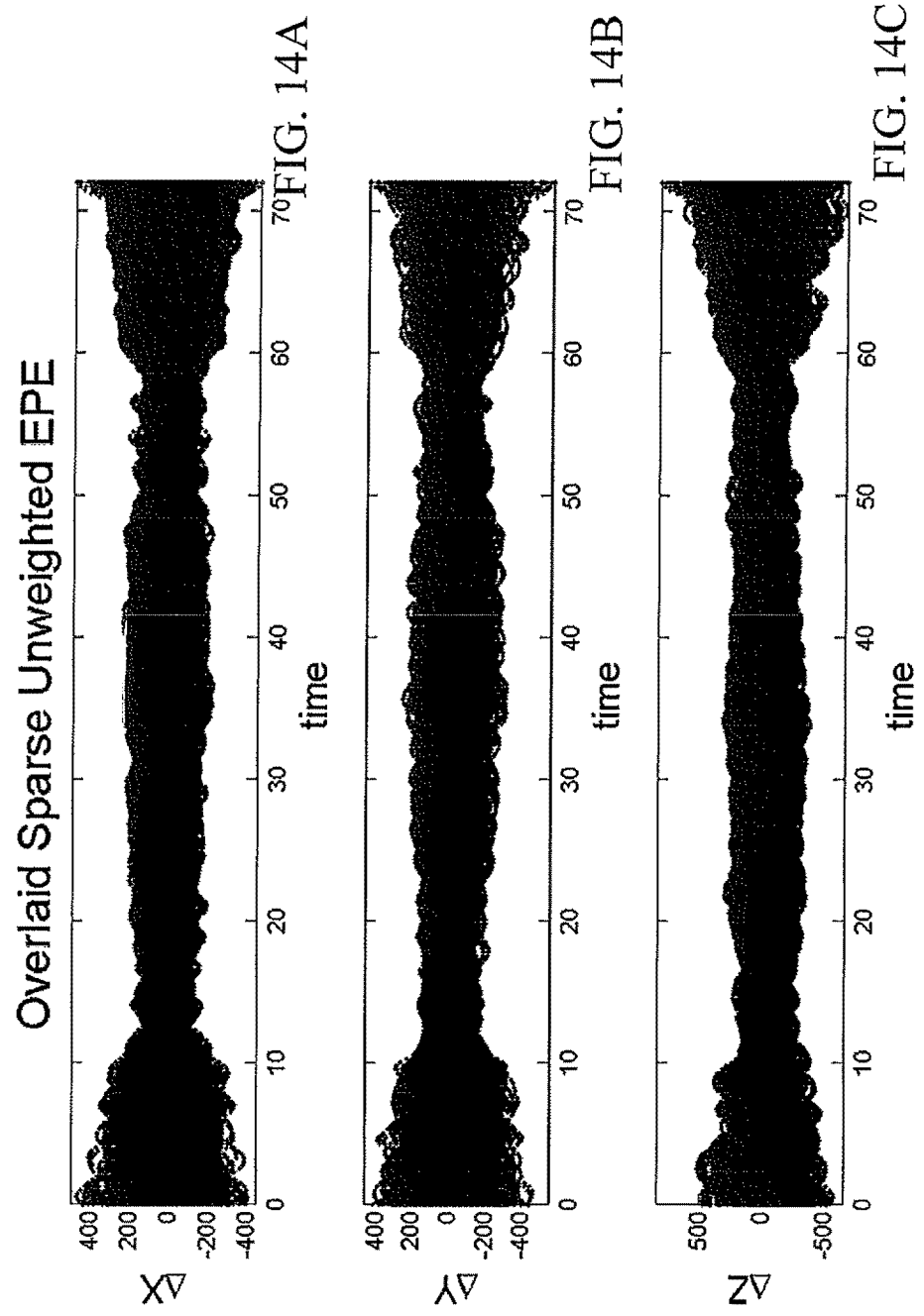

GNSS EPHEMERIS WITH GRACEFUL DEGRADATION AND MEASUREMENT FUSION

CROSS-REFERENCE TO RELATED APPLICATIONS

This application claims priority from a U.S. Provisional Patent Application No. 61/245,139, filed on Sep. 23, 2009, hereby incorporated in its entirety by reference.

STATEMENT REGARDING FEDERALLY SPONSORED RESEARCH OR DEVELOPMENT

This invention was made with government support under NNX09AN62G awarded by NASA Goddard Space Flight Center. The government has certain rights in the invention.

TECHNICAL FIELD

The present invention relates to a system and method of providing global satellite positioning of a device. More specifically, the present invention relates to a system and method of providing navigation or positioning using a global positioning system (GPS) receiver under conditions for which the broadcast data message cannot be decoded.

BACKGROUND

Satellite communication is widely used to provide communication in a variety of military, commercial, and consumer applications. These communications take place between a satellite and a ground station and/or receivers at various positions on Earth.

Global Positioning Satellite (GPS) systems have been widely used since the 1980's to provide positioning information to a receiver for commercial utilization within the United States. Such global positioning systems are used elsewhere in the world and, for example, Russia operates a similar system (GLONASS) and the European Union is developing a third system "Galileo".

GPS systems use a combination of orbiting satellites and land stations to communicate with a receiver to provide signals which may be utilized to determine the position of the receiver. Such global positioning systems are widely used for a variety of commercial purposes including providing vehicular travel location assistance, common surveying systems, a variety of agricultural and commercial applications, and/or military usage.

GPS receivers normally determine their position by computing relative times of arrival of signals transmitted simultaneously from a multiplicity of GPS satellites. By determining the relative time of arrival from each satellite, a pseudorange to that satellite can be calculated (e.g., by multiplying speed of light by the relative time). Position of a receiver on Earth can then be calculated once pseudoranges to the satellites are known.

Therefore, Global Navigation Satellite Systems (GNSS) navigation requires two steps. First, a GPS signal must be acquired and tracked by a receiver in order to calculate the pseudorange to each satellite. Secondly, the receiver needs to have accurate knowledge of the satellite positions in order to geometrically calculate the position of the receiver. The second problem is solved by providing an orbit model for the GPS constellation which is fit to the true satellite positions using a series of constant coefficients which are transmitted as part of the GPS data message. Both of these tasks become more difficult in a weak signal environment. Substantial research has been completed on the first problem suggesting the capability of acquiring and tracking GPS signals as low as 15 dB-Hz. In order to accurately download the GPS broadcast ephemeris, a high signal strength is necessary for a minimum predetermined period. This makes the second problem significantly more challenging in a weak signal environment as the orbit data will not be available as often. Significant progress has been made in formulating a GPS ephemeris capable of longer accurate propagation allowing a greater latency between the availability of new orbit data.

Once a receiver on Earth is powered, it locates and locks on to the satellites to which it has lines of sight. Thereafter, the receiver requires reception of satellite positioning data, as well as data on clock timing (ephemeris data). The ephemeris data is provided to the receiver by communicating coefficients associated with orbital parameters listed in table 1, below. The communication of the orbital parameters from the satellites is referred to as the broadcast ephemeris.

TABLE 1

Broadcast Ephemeris Data

| Parameter | Description |
|---|---|
| $M_o$ | Mean Anomaly at Reference Time |
| $\Delta n$ | Mean Motion Difference From Keplerian |
| e | Eccentricity |
| $\sqrt{A}$ | Square Root of the Semi-Major Axis |
| $\Omega_o$ | Longitude of Ascending Node of Orbit Plane at Weekly Epoch |
| $i_o$ | Inclination Angle at Reference Time |
| $\omega$ | Argument of Prelapsis |
| $\Omega$ | Right Ascenscion Linear Rate of Change |
| IDOT | Inclination Linear Rate of Change |
| $C_{UC}$ | Amplitude of Harmonic Cosine Correction to Argument of Lattitude |
| $C_{US}$ | Amplitude of Harmonic Sine Correction to Argument of Lattitude |
| $C_{RC}$ | Amplitude of Harmonic Cosine Correction to Orbit Radius |
| $C_{RS}$ | Amplitude of Harmonic Sine Correction to Orbit Radius |
| $C_{IC}$ | Amplitude of Harmonic Cosine Correction to Inclination |
| $C_{IS}$ | Amplitude of Harmonic Sine Correction to Inclination |
| TOE | Reference Time of Ephemeris |
| IODE | Issue of Data |

The broadcast ephemeris (BE) data is currently used by GPS receivers to calculate the satellites' current positions and the satellites' future positions up to a particular time into the future. An algorithm for determining the satellites' positions using the orbital parameters listed in Table 1 is provided in Navstar global positioning system interface specification (is-gps-200d) which can be found at http://www.navcen.uscg.gov/pdf/IS-GPS-200D.pdf (2004).

Determining satellites' positions based on the BE data, however, poses three challenges. First, in order to determine the satellites positions from the BE data, the BE data must be received at a sufficiently low bit error rate (BER). In order to maintain a sufficiently low BER it has been found the GPS signal must be tracked with a signal to noise ratio of at least 27 dB-Hz (see Spilker Jr. J. J. and Parkinson B. W. Global Positioning System: Theory and Applications, Vol. 1. American Institute of Aeronautics and Astronautics Inc, 1996). Second, the BE data provides an orbit model which is valid for a short period of time (e.g., four to six hours). Therefore if a receiver is operating in a weak signal environment, where the signal to noise ratio is below 27 dB-Hz, the receiver becomes unable to determine the satellite's positions. Third, because the receiver require fresh BE data downloaded from the satellites at least at expiration of validity periods of the BE data, in cases where the receiver is a handheld unit, the repeated downloads can drain the receiver's battery. This is especially problematic since reception of the complete BE data takes about 30 seconds.

In some applications, for example global asset tracking, it is not desirable to require continuous transmission of ephemeris data to all receivers in the field. Receivers could be deployed in the field for long periods of time, switching on only once per day, for a few seconds, to collect GPS signals, compute, and transmit their positions. Limiting the data collection interval to the minimum required to achieve a detectable signal to noise ratio would greatly increase the battery life.

To address the second and third issues discussed above (i.e., short period of validity as well as excessive battery usage) an extended propagation ephemeris (EPE) model was developed and described in U.S. Pat. No. 7,679,550 to Garrison et al. (hereinafter the '550 patent), incorporated herein by reference in its entirety, that can estimate positions of satellites for extended times (24 hours to 72 hours) well beyond the period of validity of the BE data. The EPE model uses a high accuracy satellite positional model or historical data of actual positional data of the satellites to determine coefficients that define the model. A least square algorithm was used to determine coefficients that define osculating orbital elements (i.e., semi-major axis (a), eccentricity (e), inclination (i), right ascension of the ascending node ($\Omega$), argument of perigee ($\omega$), and true anomaly ($\theta^*$)) and harmonic perturbation parameters in a coordinate system (e.g., the radial coordinate system (RSW)). The original EPE model used the least square filter to minimize the positional errors (i.e., estimated positions vs. actual positions) by modifying coefficients $\beta_1$ through $\beta_{23}$, and coefficients $\alpha_1$ through $\alpha_{10}$. Dominant frequencies for $f_{\theta^*}$, $f_{R1}$, $f_{R2}$, $f_{S1}$, $f_{S2}$, and $f_{W1}$ are obtained through Fourier transforms. The coefficients (i.e., $\beta_1$ through $\beta_{23}$, and coefficients $\alpha_1$ through $\alpha_{10}$) and the dominant frequencies (i.e., $f_{\theta^*}$, $f_{R1}$, $f_{R2}$, $f_{S1}$, $f_{S2}$, and $f_{W1}$) are then loaded on to the receiver to estimate position of the satellites using the following set of equations.

$$\hat{a}=\beta_1+\beta_2\theta+\beta_3\cos(2\pi f_a\theta)+\beta_4\sin(2\pi f_a\theta)$$

$$\hat{e}=\beta_5+\beta_6\theta+\beta_7\cos(2\pi f_{e1}\theta)+\beta_8\sin(2\pi f_{e1}\theta)+\beta_9\cos(2\pi f_{e2}\theta)+\beta_{10}\sin(2\pi f_{e2}\theta)$$

$$\hat{i}=\beta_{11}+\beta_{12}\theta+\beta_{13}\cos(2\pi f_i\theta)+\beta_{14}\sin(2\pi f_i\theta)$$

$$\hat{\Omega}=\beta_{15}+\beta_{16}\theta+\beta_{17}\cos(2\pi f_{\Omega 1}\theta)+\beta_{18}\sin(2\pi f_{\Omega 1}\theta)$$

$$\hat{\theta}^*=\beta_{19}+\beta_{20}t+\beta_{21}\cos(2\pi f_{\theta^* 1}t)+\beta_{22}\sin(2\pi f_{\theta^* 1}t)$$

$$\hat{\omega}=\beta_{23}$$

$$\delta R=\alpha_1\cos(2\pi f_{R1}t)+\alpha_2\sin(2\pi f_{R1}t)+\alpha_3\cos(2\pi f_{R2}t)+\alpha_4\sin(2\pi_{R2}t)$$

$$\delta S=\alpha_5\cos(2\pi f_{S1}t)+\alpha_6\sin(2\pi f_{S1}t)+\alpha_7\cos(2\pi f_{S2}t)+\alpha_8\sin(2\pi_{S2}t)$$

$$\delta W=\alpha_9\cos(2\pi f_{W1}t)+\alpha_{10}\sin(2\pi f_{W1}t) \quad (B1)$$

These coefficients and dominant frequencies are communicated to the receiver by a ground station and are used by the receiver to estimate positions of the satellites.

As indicated above, in the original EPE model it was assumed that the $f_{\theta^*}$ term for the true anomaly ($\theta^*$) is determined by applying a Fourier Transform (e.g., discrete Fourier transform (DFT)) to the calculated orbital elements. The frequency resolution of DFT is defined by:

$$\Delta f = f_s/n \quad (B2)$$

where, $f_s$ is the sampling frequency, and
n is the number of samples which is defined by:

$$n = T_{data} f_S \quad (B3)$$

where $T_{data}$ is the data length. The term $f_{\theta^*}$ determined by applying the Fourier transform results in extreme susceptibility to directional root mean square (RMS) errors for the model. Therefore, there is a need to determine the term $f_{\theta^*}$ besides finding the Fourier transform.

In addition, the original EPE model has a limitation that is shared with the GPS BE data which is the error between the estimated orbital positions of the satellites and the actual positions will be relatively uniform within the fit interval (24 or 72 hours), but will increase greatly outside of it. Therefore, it is also desirable to define a new EPE model that, for the same amount of data, would have a higher accuracy at the start of the least square fit, and has a gradual reduction in accuracy as the time from beginning of the validity of the EPE model (i.e., 24 to 72 hours) increases.

SUMMARY

In one form thereof, a method for providing an extended propagation ephemeris model for a satellite in Earth orbit has been developed. The method includes obtaining a satellite's orbital position over a first period of time. The method further includes applying a least square estimation filter to determine coefficients defining osculating Keplarian orbital elements and harmonic perturbation parameters associated with a coordinate system defining an extended propagation ephemeris model that can be used to estimate the satellite's position during the first period, wherein the osculating Keplarian orbital elements include semi-major axis of the satellite (a), eccentricity of the satellite (e), inclination of the satellite (i), longitude of the ascending node of the satellite ($\Omega$), true anomaly ($\theta^*$), and argument of periapsis ($\omega$). The method also includes applying the least square estimation filter to determine a dominant frequency of the true anomaly, and applying a Fourier transform to determine dominant frequencies of the harmonic perturbation parameters.

In another form thereof, a method for providing an extended propagation ephemeris model for a satellite in Earth orbit has been developed. The method includes obtaining a satellite's orbital position over a first period of time. The method also includes calculating coefficients defining osculating Keplarian orbital elements and harmonic perturbation parameters associated with a coordinate system defining an extended propagation ephemeris model that can be used to estimate the satellite's position during the first period. The method further includes applying a Fourier transform to determine dominant frequencies of the harmonic perturbation parameters, and weighting the extended propagation ephemeris model according to a weighing function so that the extended propagation ephemeris model generates a highest level of accuracy at the beginning of the first period.

In another form thereof, a method for estimating position of a receiver based on an extended propagated ephemeris model has been developed. The method includes storing data associated with an extended propagated ephemeris model in a memory in a receiver, wherein the model can be used to estimate position of a satellite for a first period of time. The method also includes receiving a broadcast ephemeris data from the satellite by the receiver, wherein the broadcast ephemeris data can be used to estimate position of the satellite for a second period of time. The method further includes fusing the data associated with the extended propagated ephemeris model stored in the memory with the broadcast ephemeris data by a processor onboard the receiver, wherein position of the satellite can be estimated based on the fused data of the extended propagated ephemeris model and the broadcast ephemeris data.

BRIEF DESCRIPTION OF DRAWINGS

FIGS. 3A, 3B, and 3C are graphs of positional variations vs. time after applying a first least square estimation filter;

FIGS. 4A, 4B, and 4C are graphs of positional variations vs. time after applying a second least square estimation filter;

FIGS. 8A, 8B, and 8C are graphs of positional variation vs. time showing the overlays of the long term error for the first estimation of a weighted extended propagation ephemeris (EPE) model;

FIGS. 9A, 9B, and 9C are graphs of positional variation vs. time showing a broadcast ephemeris (BE) update at 0 hours to an unweighted EPE to generate a fused ephemeris (FE);

FIGS. 12A, 12B, and 12C are graphs of positional variations vs. time for a fusion of sparse measurement and unweighted EPE data;

FIGS. 13A, 13B, and 13C depict graphs of positional variations vs. time for a fusion of sparse measurement and weighted EPE data;

FIGS. 14A, 14B, and 14C are graphs of positional variation vs. time showing the overlaid error for the unweighted EPE generated with sparse measurements;

DETAILED DESCRIPTION

Figure 1:
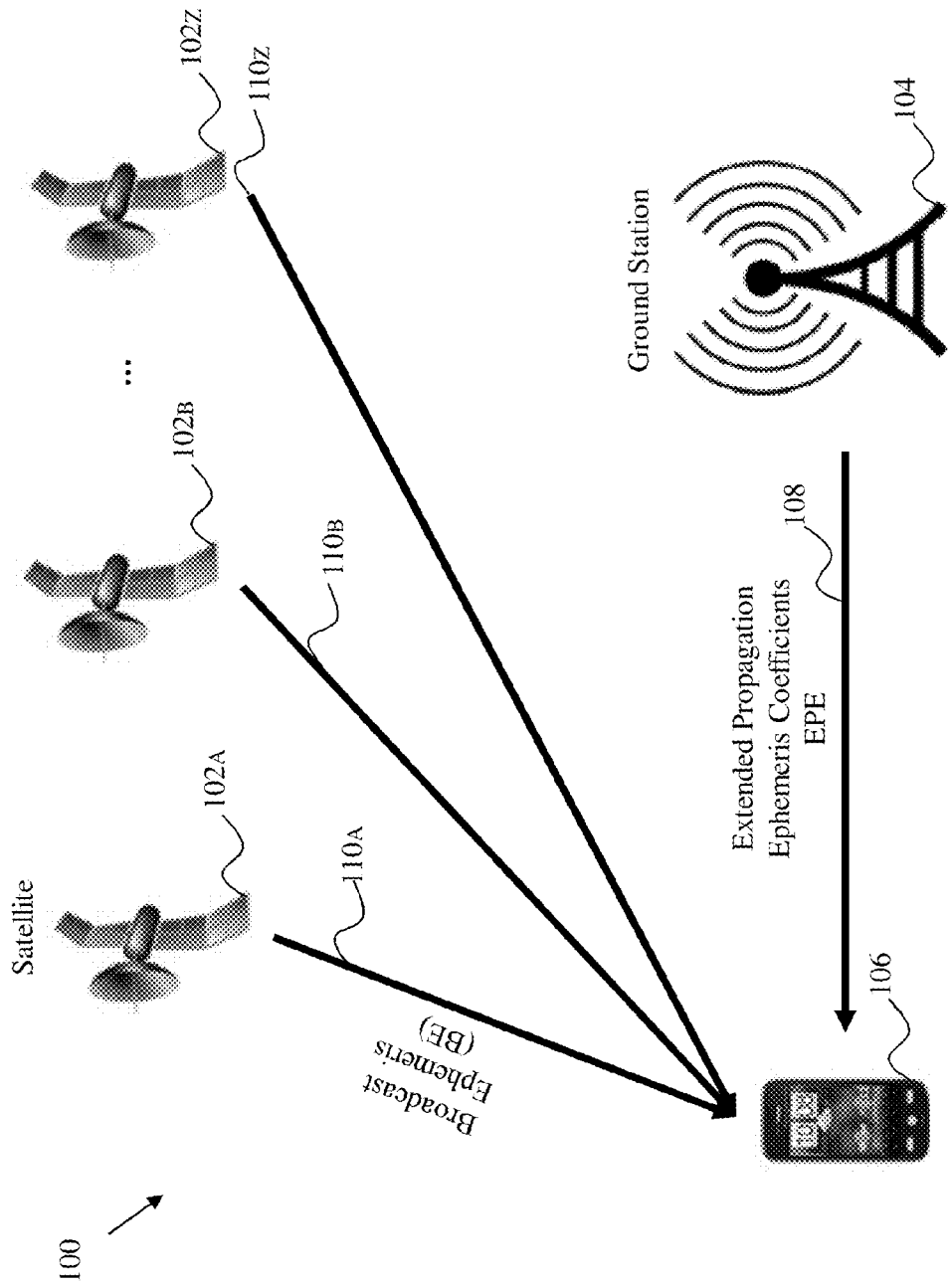
FIG. 1 is a schematic of an embodiment of a system for geolocating a receiver.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a schematic of an embodiment of a system 100 for geolocating a receiver is depicted. The system 100 includes a plurality of satellite 102 (depicted are $102_A$ and $102_B$ through $102_Z$) in Earth's orbit. The system 100 further includes a ground station 104 and a receiver 106. The ground station 104 is configured to communicate coefficients for an extended propagation ephemeris model, described below, as indicated by reference numeral 108. Each satellite 102 is also configured to communicate a broadcast ephemeris model, including coefficients for orbital parameters included in the background section of the instant application, as indicated by reference numeral 110 (depicted are $110_A$ an $110_B$ through $110_Z$).

Extended Propagation Ephemeris Model

The extended propagation ephemeris (EPE) model is generated based on either (i) an ensemble of actual coordinates of satellites or (ii) based on a high accuracy model. In either case, the level of calculation complexity may be excessive for some receivers. In the embodiment shown in FIG. 1, the ground station 104 performs the necessary calculations and transmits coefficients that define an extended propagation ephemeris model using radio frequency signals, WiFi, or other known communication schemes. Using the first method (ensemble of actual coordinates), an ensemble of 700 orbit arcs, obtained from the International Global Navigation Satellite Systems Services, are used to obtain precise orbits covering a 6 month period between January and July of 2003, separated in steps of 6 hours. Using these actual coordinates, a set of coefficients define the EPE model including osculating orbital elements and harmonic perturbations according to the set of equations provided below.

$$a = \beta_1 + \beta_2\theta + \beta_3\cos(2\theta) + \beta_4\sin(2\theta)$$

$$e = \beta_5 + \beta_6\theta + \beta_7\cos(\theta) + \beta_8\sin(\theta) + \beta_9\cos(3\theta) + \beta_{10}\sin(3\theta)$$

$$i = \beta_{11} + \beta_{12}\theta + \beta_{13}\cos(2\theta) + \beta_{14}\sin(2\theta)$$

$$\Omega = \beta_{15} + \beta_{16}\theta + \beta_{17}\cos(2\theta) + \beta_{18}\sin(2\theta)$$

$$\theta^* = \beta_{19} + \beta_{20}t_k + \beta_{21}\cos(2\pi f_{\theta^*}t_k) + \beta_{22}\sin(2\pi f_{\theta^*}t_k)$$

$$\omega = \beta_{23} \quad (1)$$

where a is the semi-major axis of the satellite,
e is eccentricity of the satellite,
i is the inclination of the satellite,
$\Omega$ is the right ascension of the ascending node of the satellite,
$\omega$ is the argument of perigee of the satellite,
$\theta^*$ is the true anomaly of the satellite,
$\theta$ is a time series of arguments of latitude for the satellite's orbital positions based on equation:

$$\theta = \theta^* + \omega \quad (2)$$

Figure 2:
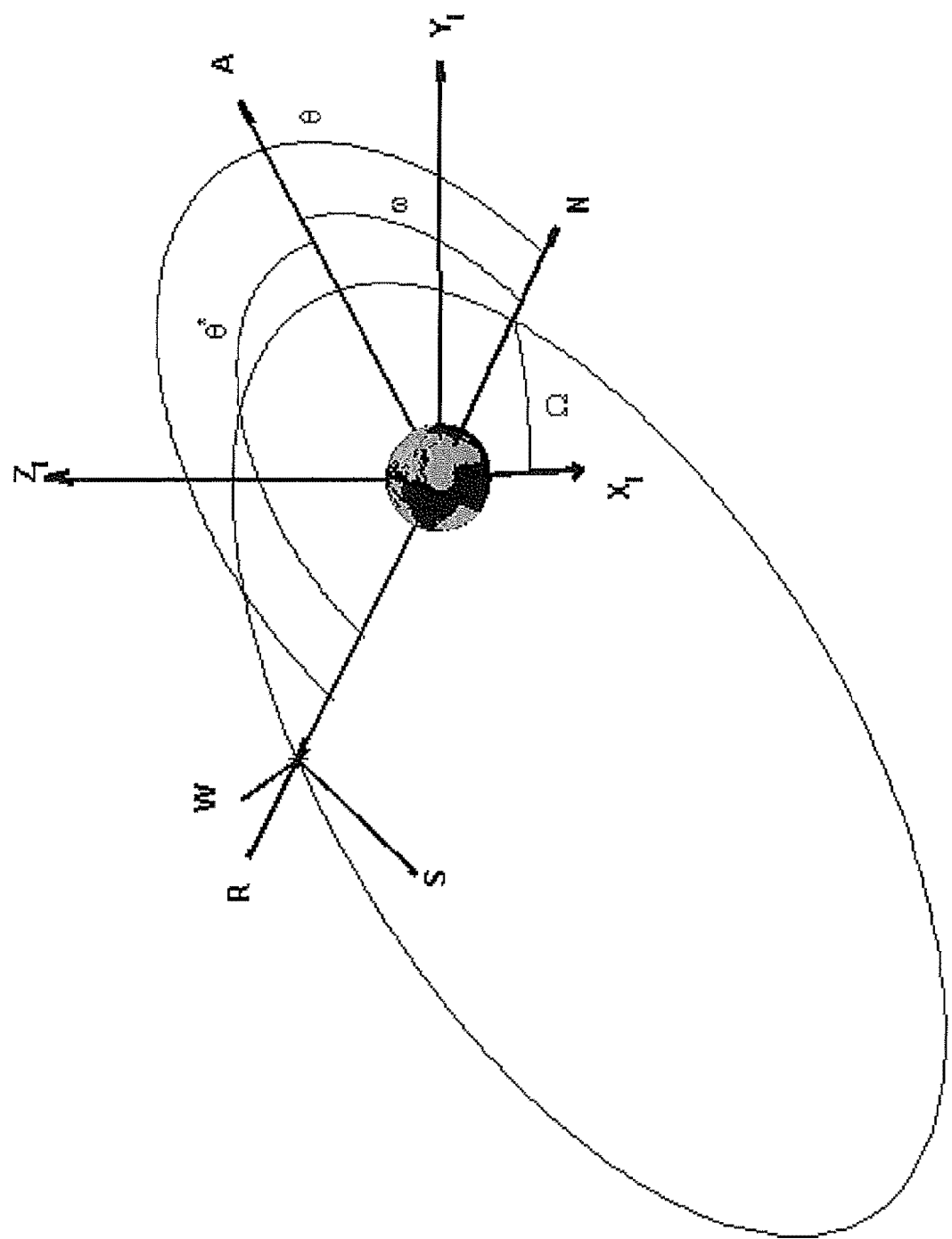
FIG. 2 is a schematic depicting orbital elements in a Cartesian and Radial coordinate systems.

$t_k$ is based on equation $$t_k = t_{ow} - t_{oe} \quad (3)$$

wherein $t_{ow}$ is time from beginning of week (i.e., a counter that resets at beginning of each week),
$t_{oe}$ is EPE epoch (i.e., measurement interval of the EPE model), and $f_{\theta*}$ is the dominant frequency of the true anomaly. FIG. 2 depicts these orbital elements with respect to a Cartesian and a radial coordinate system.

The 23 β coefficients as well as the $f_{\theta*}$ term are determined using a least square fit batch filter to fit to the initial positions measurements. Based on the estimated coefficients the motion of the satellite can be calculated at times corresponding to the actual measurements. This comparison can generate a set of position residuals in an earth centered—earth fixed (ECEF) reference frame. These position residuals are then be rotated into a radial coordinate system (RSW) frame depicted in FIG. 2. With the residuals positions in the RSW frame determined, a Fourier transform (e.g., a discrete Fourier transform (DFT)) can be used to calculate dominant frequencies in each direction (i.e., R, S, and W). The top two dominant frequencies in the R and S directions will be stored as well as the most dominant frequency in the W direction. Therefore, a total of five frequency components must be calculated by the Fourier transform. These frequencies and the position residuals are then applied to a second estimator to compute ten α coefficients (i.e., $\alpha_1$ through $\alpha_{10}$) based on the following equations:

$$\delta r = \alpha_1 \cos(2\pi f_{r1} t) + \alpha_2 \sin(2\pi f_{r1} t) + \alpha_3 \cos(2\pi f_{r2} t) + \alpha_4 \sin(2\pi f_{r2} t)$$

$$\delta s = \alpha_5 \cos(2\pi f_{s1} t) + \alpha_6 \sin(2\pi f_{s1} t) + \alpha_7 \cos(2\pi f_{s2} t) + \alpha_8 \sin(2\pi f_{s2} t)$$

$$\delta w = \alpha_9 \cos(2\pi f_w t) + \alpha_{10} \sin(2\pi f_w t) \quad (4)$$

With the β and α coefficients and frequency coefficients determined (including $f_{\theta*}$), the EPE model can be applied to solve the satellite's position.

Another way to implement an estimator for the EPE model is to assume the frequencies associated with the perturbations in the RSW frame are already known (i.e., based on harmonic perturbations, including lunar and solar perturbations of the satellite). Based on this assumption the calculation of the β and α parameters can be combined into one least square estimator.

Of particular importance is the term $f_{\theta*}$. As described in the background section of the instant application the '550 patent determined this term by applying a DFT to the calculated orbital elements (see equations B1). The frequency resolution (see equations B2 and B3) is the inverse of $T_{data}$, where $T_{data}$ is the data length. Even small variations of $1/f_{\theta*}$ from its correct value results in drastic change in the directional root mean square (RMS) errors for the EPE model. These variations are shown in Table 2.

TABLE 2

Variations in RMS errors for the EPE by varying $1/f_\theta*$

| $1/f_\theta$ L * (sec) | RMS X Direction (m) | RMS Y Direction (m) | RMS Z Direction (m) |
| --- | --- | --- | --- |
| 43072 | 147.2688 | 127.7544 | 111.2808 |
| 43074 | 86.2773 | 79.2999 | 66.9464 |
| 43076 | 35.2412 | 38.7593 | 36.5980 |
| 43078 | 81.0057 | 63.8188 | 77.5362 |
| 43080 | 150.6947 | 118.1253 | 129.4248 |

In order to accurately estimate the value of $f_{\theta*}$ within one or two seconds, a tremendous amount of data (e.g., 200 months of data) is needed. Since the DFT method is not sufficient to calculate $f_{\theta*}$ to the required accuracy of the model $f_{\theta*}$ was added as a parameter (i.e., the $24^{th}$ parameter) for the estimator to calculate in the first fit.

Once the new EPE model was developed, it was tested for various time intervals against actual satellite positions by determining position of a receiver on Earth with a multiplicity of satellites. For a 24 hour ephemeris, 88% of cases met a goal of an RMS error of 15 m during the first 6 hours and 94% of cases met a goal of an RMS error of 80 m for the full propagation length. For a 72 hour ephemeris, 92% of these cases met a goal of an RMS error of 25 m during the first 6 hours and 83% of cases met a goal of an RMS error of 170 m for the full propagation length.

Numerical Results of the EPE Model

In order to gain a full characterization of the EPE model accuracy the EPE model needed to be analyzed over a large data range. A period of IGS orbit data ranging from week 1199 to week 1227 was selected. While the EPE model can be used for any fit length, 72 hour orbit fits were generated for the entirety of the analysis as these provided the most useful results. Each fit portion was separated by 6 hours from the previous fit, which was done over the entire period of data in order to get a long term perspective of the feasibility of using the EPE model. The mean and RMS error of each fit was then calculated so that a comprehensive set of statistics could be determined.

FIGS. 3A, 3B, and 3C depict overlays of along term error (i.e., for a period of 28 weeks) for the first fit of the EPE model. As described above the first fit included determining β coefficients (i.e., $\beta_1$ through $\beta_{23}$) by a least square estimator. While some results fall in line with the error shown in the '550 patent (which used a much shorter period) it is obvious that there are a significant range of errors that can be seen. Overall it can be deduced that the first fit provides between ±500 m error in each direction over a full 72 hour fit.

FIGS. 4A, 4B, and 4C depict overlays of the long term error for the second fit of the EPE model. These figures show a decrease in error to around ±400 m or lower. It should be noted that for some cases the second fit has a better effect than for other cases. It can also be noted that in FIGS. 3A, 3B, and 3C error from TOE+0 to TOE+10 hours and TOE+60 to TOE+72 hours show considerable higher error than those in the middle period of the model. This feature, while still prominent is noticeably diminished in FIGS. 4A, 4B, and 4C.

Inspecting the mean error of the model after the first and second fits over the long term will help to make sure that the estimation algorithm is operating properly on all sets of data. Ideally the mean error should be exactly zero, however since there are stand alone position terms in the fit, there should be offsets in the mean error. Therefore a low overall mean error should point at the success of the estimation algorithm.

Figure 5:
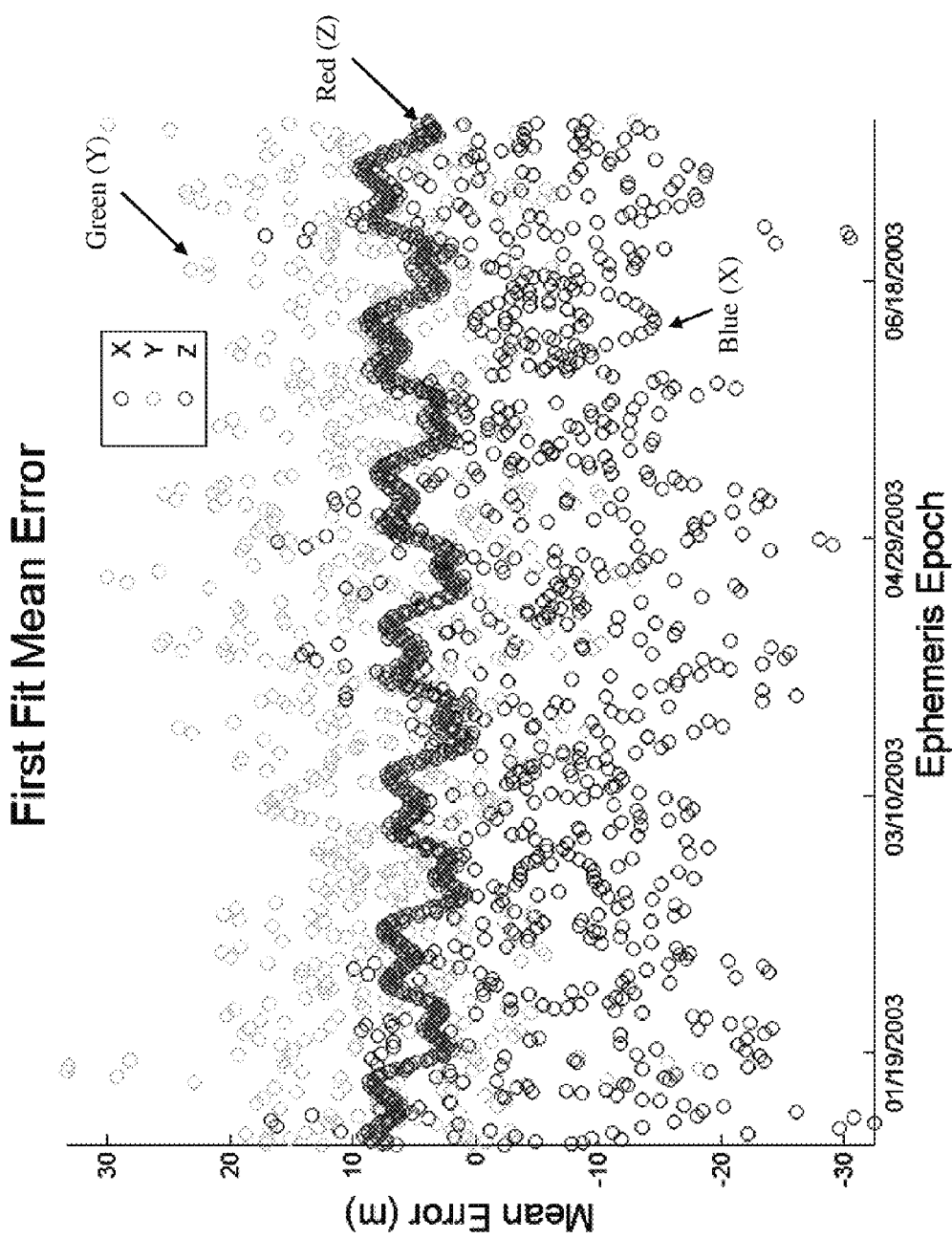
FIG. 5 is a graph of mean error vs. time after application of the first estimation filter.

FIG. 5 depicts the mean error in each direction after the first fit. From the results it becomes apparent that the errors are not all zero mean and not evenly distributed about zero. However, the mean errors do all seem to lie between about ±20 m which points to the fit working over the long term. This line of analysis can thus be continued by checking the mean error of each EPE after the second fit. FIG. 6 depicts a small change in the mean error of each fit by applying the second EPE fit. In addition, inspecting the RMS error provides additional understanding of the quality of each fit.

Figure 6A:
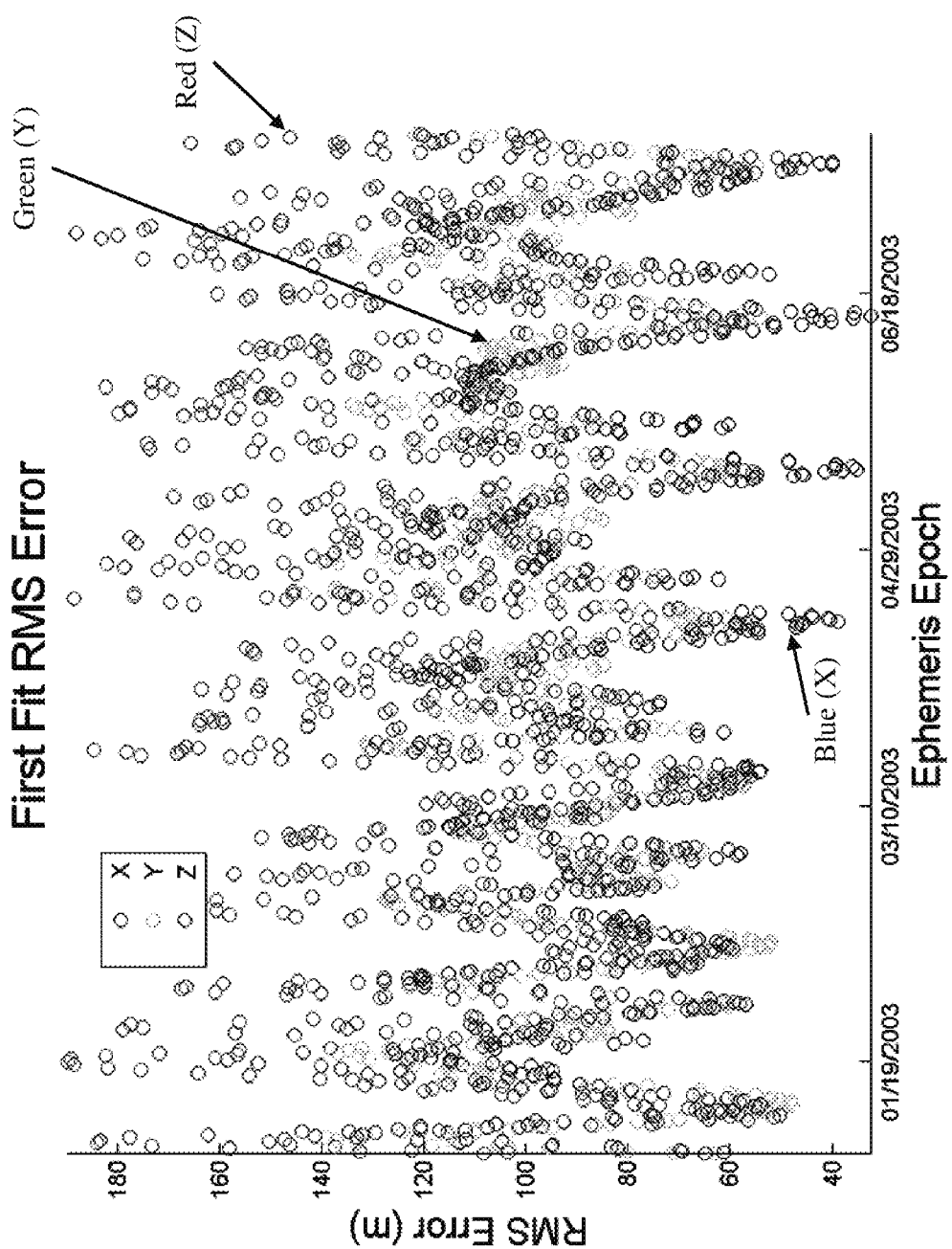
FIG. 6A is a graph of root mean square (RMS) error associated with the first estimation filter for a long term analysis.

FIG. 6A depicts the RMS error for the first fit for the long term analysis of EPE fits. The ECEF X and Y direction show RMS errors ranging from 55 to 130 meters while the Z direction shows RMS error between 60 and 180 meters. Furthermore there seems to be an obvious periodic nature to the change in RMS error. By picking the points where the RMS error in each direction drops to around 60 m we can approximately determine the period of change in RMS error. Interestingly enough this period seems to remain around 25 to 29 days. Considering that the moon orbits earth with an orbital period of approximately 27 days we can speculate that this effect may be caused by unmodeled lunar perturbations.

Figure 6B:
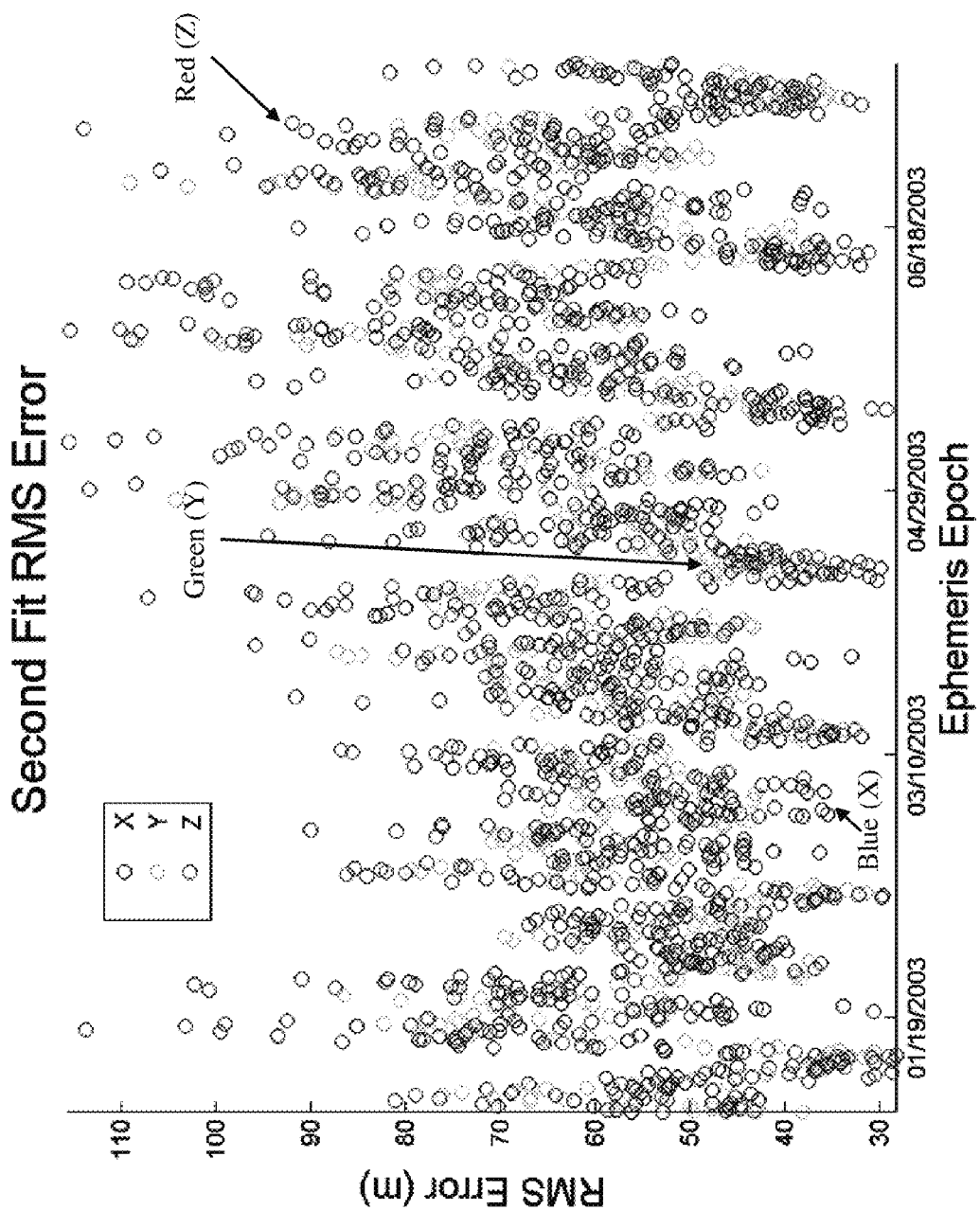
FIG. 6B is a graph of RMS error associated with the second estimation filter for the long term analysis.

FIG. 6B depicts the RMS error for the second fit for the long term analysis of EPE fits. The application of the second fit significantly reduces RMS error. Overall the RMS error in the ECEF X and Y direction drops to ranges between 30 and 80 meters and the Z direction drops to values between 30 and 110 meters. Furthermore, while the periodic trend seen in FIG. 6A is still present, it is not nearly as pronounced. Overall this verifies the effectiveness of the second fit and reinforces the conclusions seen from the first fit-only analysis. Based on the long term analysis of the model it can be seen that the EPE model presented in '550 patent can be used over the long period but the overall RMS errors associated with the model depend in part on the lunar period.

Figure 7:
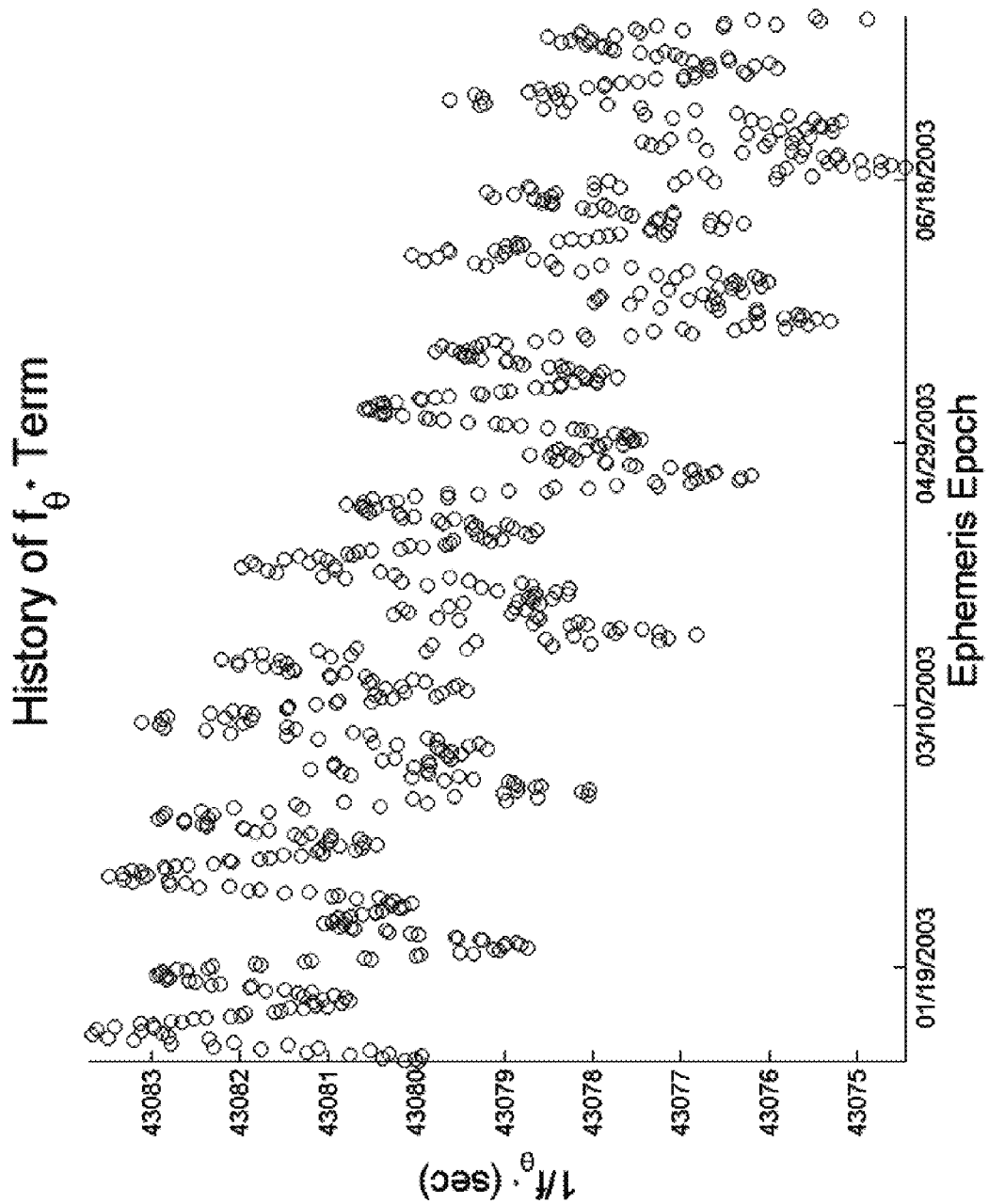
FIG. 7 is a graph of $1/f\theta^*$ vs. ephemeris epoch showing a history of the $f\theta^*$ term.

Furthermore, results of adding the $f_{\theta*}$ term as an estimated parameter in the EPE model and including this term in the long term analysis is provided in FIG. 7. After analysis of the long term data set, the history of $f_{\theta*}$ for each of the calculated fits can be examined. The value of the $f_{\theta*}$ term varies within 10 seconds of the initial estimate for all fits in the data interval. The DFT method would have had no chance of accurately calculating this value without an enormously large amount of data. Observing change in the $f_{\theta*}$ term and remembering that the value for the $f_{\theta*}$ term must be accurate on the order of 1 second means that adding this term to the estimator provides a more accurate EPE model.

Weighting the Model

One disadvantage of the EPE model provided in the '550 patent is that the error is evenly distributed throughout the entire model. This means that even if the receiver can update the EPE model coefficients using some source (either the ground station or the satellite) at a rate faster than the EPE model's period of validity, such an update would provide no real benefit. According to one aspect of the present disclosure, a predetermined decay in accuracy can be designed in the EPE model as time progresses from the beginning of the period of validity of the model. Ideally the EPE model would have the best accuracy near the model epoch (TOE) and would then decay in accuracy as time progressed. Using a set of EPE coefficients generated via a weighted least squares estimator would allow for this type of behavior. Adding weighting to the model requires the selection of the weighting function. Since each measurement contains a full position vector (i.e., a 3×3 matrix) the weighting matrix for each measurement is also a 3×3 matrix. Furthermore, since each direction in the position vector is uncorrelated to another direction and has the same accuracy it can be concludes that the 3×3 weighting matrix should be diagonal and have the same value along the diagonal axis of the matrix. This can be simplified to a constant multiplied by the 3×3 identity matrix:

$$R^{-1} = \begin{bmatrix} W(t) & 0 & 0 \\ 0 & W(t) & 0 \\ 0 & 0 & W(t) \end{bmatrix},$$

where W(t) is defined based on equation:

$$W(t)=1-t/T_P,$$

where $T_P$ is length of the EPE period of validity.

Several different weighting schemes were investigated and a simple linear weighting function was found to be the best overall choice for weighting the measurements. This linear weighting function starts at a weighting value of 1 at TOE and continues to a value of zero at the end of the EPE fit. Other weighting functions, however, may be used based on the equation:

$$w(t)=1-(t_k-\text{TOE})/T_1 \quad (5)$$

where, $T_1$ is the length of the ephemeris fit and $t_k$ is the time since beginning of week. To include the weighting function in the least square estimator, a covariance matrix which is generated as part of the least square estimation process, can be substituted with the weighting matrix described above.

Figure 8D:
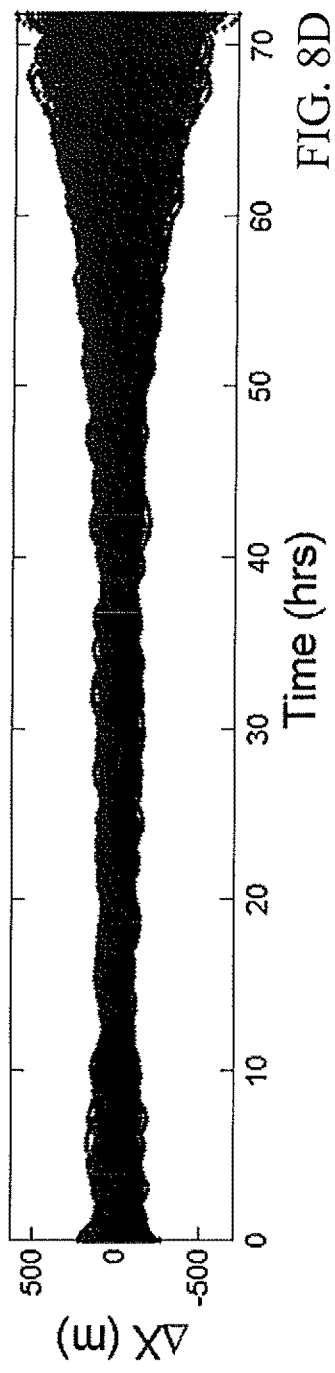
FIGS. 8D, 8E, and 8F are graphs of positional variation vs. time showing the overlays of the long term error for the second estimation of the weighted EPE model.
Figure 8E:
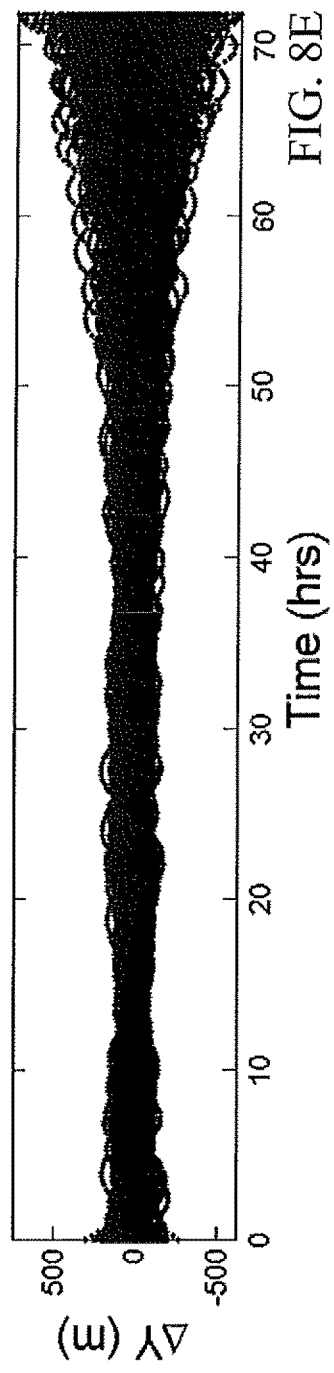
Figure 8F:
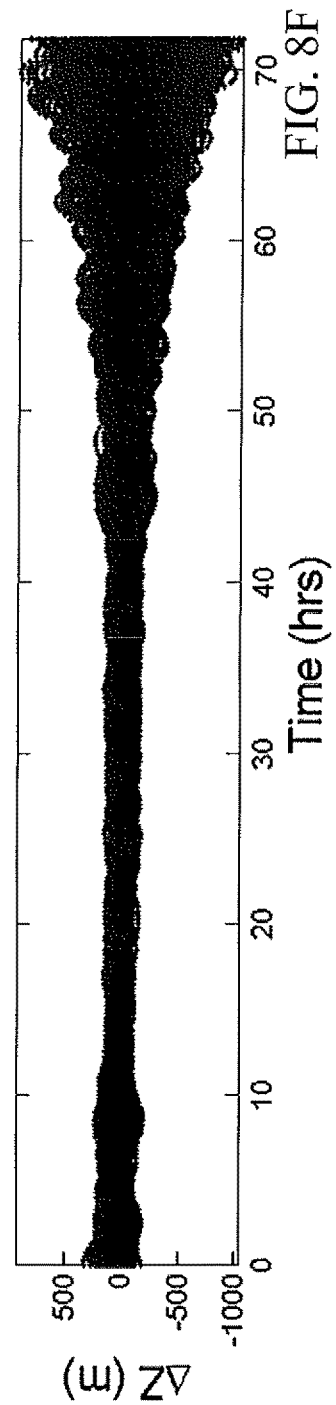

About the same long term study as before was performed on the weighted EPE model. Weighted EPEs were generated for 72 hours fits for orbit data covering from week 1199 day 3 to week 1227. Each EPE epoch is spaced in 6 hour intervals to provide coverage of many possible scenarios of EPE use. FIGS. 8A, 8B, and 8C depict the overlays of the long term error for the first fit of the weighted EPE model. With the weighting applied over the long term it can clearly be seen that the overall trend in FIGS. 8A, 8B, and 8C show that for the first fit the weighting function has successfully caused a decrease in accuracy as a function of time. During earlier times of the ephemeris, the error can be as low as ±100 m and as time increases the error becomes as high as ±900 m near the end of the model. FIGS. 8D, 8E, and 8F depict overlays of errors for the second fit, it can be clearly seen that the second fit applies the weighting scheme correctly as well.

Applying RMS error analysis as was provided above shows that RMS error in both the weighted and unweighted cases does not stay at the low values reported in the '550 patent, the RMS error for each fit does change depending on the fit epoch, this change occurs periodically with the lunar period. Furthermore it was found that a weighted least squares estimator can be used with a linear weighting function and will result in the error of the EPE having a gradual secular increase with time. These cases were also examined and shown to be valid for a multitude of different EPE epochs. With the long term validity of the model proven it is desired to come up with methods to further improve the EPE accuracy without changing the overall structure of the orbit model.

Measurement Fusion

According to one aspect of the present disclosure, a GPS receiver using an EPE model can be configured to merge a broadcast ephemeris (BE) data with the EPE model. The overall goal of this kind of scenario would be to use the new measurements from BE data received from the satellite to update the EPE model coefficients. Fusing ephemeris can be accomplished by using an existing EPE model in conjunction with a new BE using a batch filter as well as an apriori unweighted coefficients of the EPE model. Specifically, the fusing of the BE data with the EPE model includes running a new batch of least square estimators that are provided in the receiver to determine β terms (i.e., β1 through β23), $f_{\theta*}$, and a terms (i.e., $\alpha_1$ through $\alpha_{10}$).

Several examples of fusion are explored and the resultant Fused Ephemeris (FE) for each case is compared to the original EPE and the BE used for update. All FE's investigated are referenced in terms of their EPE epoch (TOE) and the time at which the BE data become available (e.g., TOE+24 hours).

The first example of a FE was for a 72 hour unweighted EPE with measurement updates from a BE at TOE+0 hours with an epoch at week 1473. This case is most likely for a receiver to encounter in a scenario where it is using an EPE in a case where the signal strength is sufficiently strong to immediately download the BE from the GPS data message as well.

FIGS. 9A, 9B, and 9C depict a BE update at 0 hours to an unweighted EPE to generate a FE. These figures show noticeable improvements in the FE scenario but not over the rest of the EPE period of validity. We can also see in this scenario that both the EPE and FE remain noticeably better than just propagating the BE outside of the validity period of the BE. It can be clearly seen that the FE data matches closely with the BE data during the period of validity of the BE data, and then the FE data matches closely to the EPE data well outside of the period of validity of the BE data.

Figures 10A, 10B, 10C:
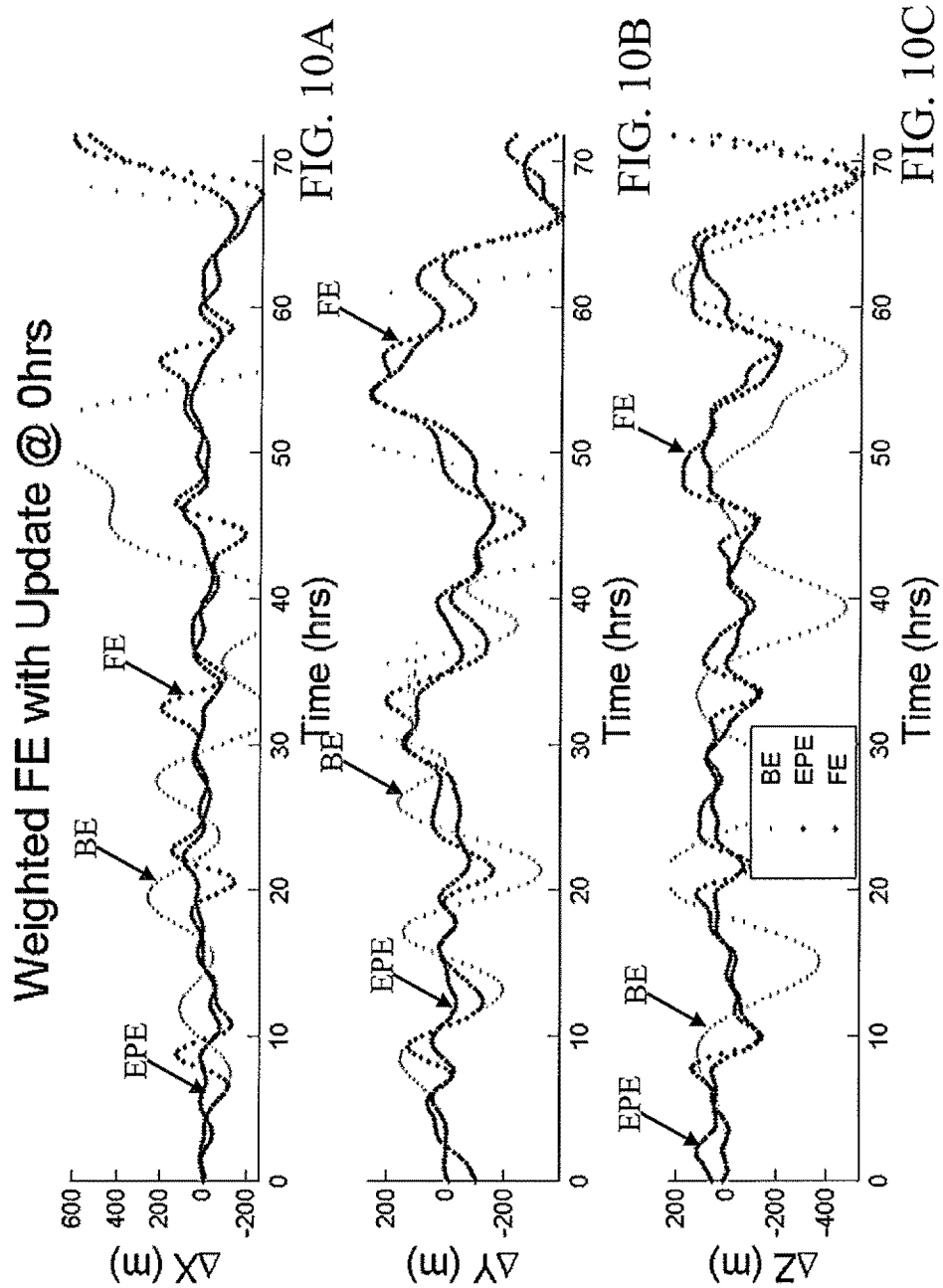
FIGS. 10A, 10B, and 10C are graphs of positional variation vs. time showing a BE update at 0 hours to a weighted EPE to generated a FE.

The next FE example investigated was for a 72 hour weighted EPE with measurement updates from a BE at TOE+0 hours with an EPE epoch at week 1473. FIGS. 10A, 10B, and 10C depict a BE update at 0 hours to a weighted EPE to generated a FE. These figures show that the error over the first 4 hours is greatly reduced (i.e., compared with FIGS. 9A, 9B, and 9C) at a price of a slight increase in error over the rest of the FE.

Figures 11A, 11B, 11C:
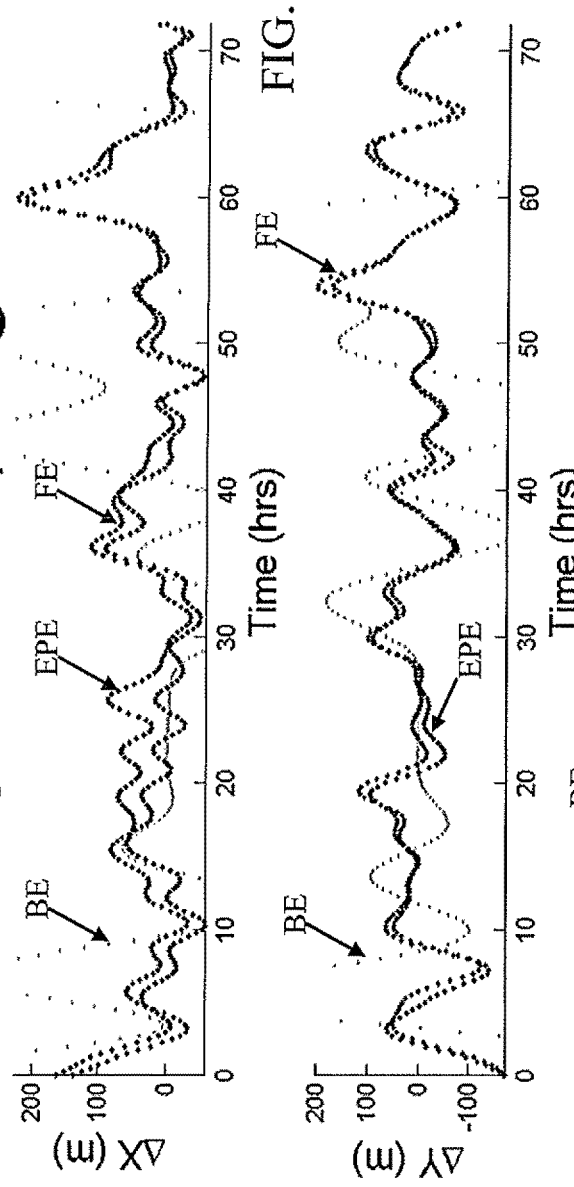
FIGS. 11A, 11B, and 11C are graphs of positional variation vs. time showing a BE update at 24 hours to an unweighted EPE to generate a FE.

The next case investigated was for a weighted and unweighted EPE with BE measurement updates available at 24 hours. This case is more representative of a scenario which would be encountered in a working navigation receiver. This FE was generated with updates at 24 to 30 hours with an EPE epoch at week 1473. FIGS. 11A, 11B, and 11C depict a BE update at 24 hours to an unweighted EPE to generated a FE. It can be seen in these figures that the FE shows improved accuracy from TOE+24 to TOE+30 hours much as expected. There is a small amount of increase in error over the rest of the FE when compared to the EPE, which is again the cost of getting improved accuracy during one time period. Also, it can again be seen that the both the FE and EPE remain significantly better than simply over propagating the BE. Similar FE runs were performed for a long series of epochs starting at week 1199 day 3 through 1227 week day 7.

Based on the results of fusion studies several conclusions can be drawn about fusing BE data with an EPE model. The first observation is that fusion of BE data can be used to make the weighted EPE decay in a more desirable fashion by increasing accuracy over the first 6 hours. The second observation is that fusing the BE data with the EPE model partially improves the overall accuracy of an EPE.

Measurement Fusion with Sparse Measurements

According to another aspect of the present disclosure, the receiver can be configured to receive positional measurements from a ground station and fuse the positional information with EPE model coefficients (all on the receiver). Since the receiver may already be equipped with an estimator built in to perform BE-EPE fusion, the receiver can use the same estimator to perform positional data-EPE fusion. When fusing sparse measurements, the EPE coefficients (i.e., $\beta_1$ through $\beta_{23}$, $\alpha_1$ through $\alpha_{10}$ and the term $f_{\theta*}$ via a least square estimation) as well as dominant frequencies ($f_{R1}$, $f_{R2}$, $f_{S1}$, $f_{S2}$, and $f_W$ via Fourier transformations) can be calculated onboard the receiver. The only values received by the receiver are raw positional measurements.

In order to transmit raw position measurements the proper amount of transmitted data may be considered. The overall data load for a large number of measurements compared to 39 EPE parameters can be quite different. Therefore a minimum number of measurements that can be transmitted in order to properly generate an EPE must first be determined. Also, in order to cut down on the amount of data that needs to be transmitted it can be assumed that the measurements are equally spaced in time. Therefore instead of transmitting a time-stamp for each measurement, one measurement epoch can be used.

One a receiver has the transmitted measurements and generates an EPE it could then use its EPE state vector as an apriori state along with any received BE measurements and any of the remaining original measurements that are still applicable to generate a fused ephemeris of sparse positional data (hereinafter, "sparse measurements").

The International Global Navigation Satellite Systems Services (IGS) final products which are widely considered to be the "truth state" of a GPS satellite are given at a spacing of 900 seconds. Since the truth data is spaced at 900 seconds and this provides a successful EPE, 900 seconds was chosen as the minimum spacing ($\Delta T$) between measurements. A $\Delta T$ can then be picked as a multiple of $T_{IGS}$ so that there would always be a truth position available for the desired measurement time, where k can be 1, 5, 10, 15, 20. The EPE for the test of sparse measurements was chosen for with an epoch in week 1473.

An unweighted EPE model was determined to fit the sparse measurements for each value of $\Delta T$ and the RMS error in each direction was determined. By comparing the RMS errors and locating the values of $\Delta T$ that demonstrate an increase in RMS, the maximum value of $\Delta T$ can be determined. It should be noted that the RMS error is calculated by calculating EPE positions at a spacing of 900 seconds and comparing them to the IGS truth data. This allows to measure the performance of the EPE model compared to the highest rate truth data available rather than just the estimator residual data. Based on experimentation, for values of k above 10 it was observed that the RMS error increased. Therefore, the maximum value for $\Delta T$ is set to 9000 seconds.

Precision values were picked starting out at the IGS measurement precision of 1 cm and which was increased by factors of 10 until the RMS error in any direction showed a significant increase. These EPE models were calculated using a series of sparse measurements with $\Delta T$ of 9000 seconds. The RMS was calculated by generating the EPE positions at the full IGS rate and computing the error compared to the full precision IGS truth data.

Based on these experiments, it was observed that the RMS error of the EPE does not greatly change until the measurement precision hits 100 meters. Therefore the measurement precision for the transmitted measurements is set to 10 meters. To force the precision of the IGS measurements to 10 meters before transmission the data was rounded to the nearest 10 digits (e.g., 123.456 becomes 120.000 and 127.222 becomes 130). This ensures that the 10's digit is the lowest order digit that must be transmitted and that the difference between the transmitted measurement and truth is always within 5 meters.

As with the BE-EPE fusion, the investigation of the sparse measurement EPEs was performed by a single case analysis of both a weighted and unweighted EPE model. Also, as with the BE-EPE fusion case, the EPE was generated with an epoch of week 1473.

FIGS. 12A, 12B, and 12C depict graphs of positional variations vs. time for a fusion of sparse measurement and unweighted EPE data. These figures show the error in each direction for the EPE generated with sparse measurements. The continuous lines represent the error calculated at the full data rate of the IGS truth data while the dots represent the position residuals in each direction output by the EPE. It can be clearly observed that the error in each direction from the sparse unweighted EPE fusion are similar to the errors found in the long term analysis of the unweighted EPE calculated with full rate data.

FIGS. 13A, 13B, and 13C depict graphs of positional variations vs. time for a fusion of sparse measurement and weighted EPE data. The continuous lines represent the full IGS truth rate error and the dots represent the position residuals calculated from sparse measurements.

A long term set of EPE estimated positional data is analyzed by generating EPEs using sparse measurements with ΔT of 9000 seconds and a measurement precision of 10 meters. The sparse EPEs are generated with epochs starting on week 1199 day 3 through 1227 week day 7 and spaced by 6 hours each. The results were analyzed for both the unweighted and weighted EPEs.

The first set of EPEs generated was for the unweighted EPEs using sparse measurements. The first method of analyzing the EPEs from this set is the overlay of the position errors in each direction. FIGS. 14A, 14B, and 14C depict the overlaid error results of positional error vs. time for the unweighted EPE generated with sparse measurements. These figures show that the error seems to remain between ±400 meters which is fairly similar to the case examined in FIGS. 3A, 3B, and 3C. While not shown, the RMS error from the unweighted EPEs generated using sparse measurements had similar trends as those in FIGS. 5 and seem to follow the lunar cycle.

Figures 15A, 15B, 15C:
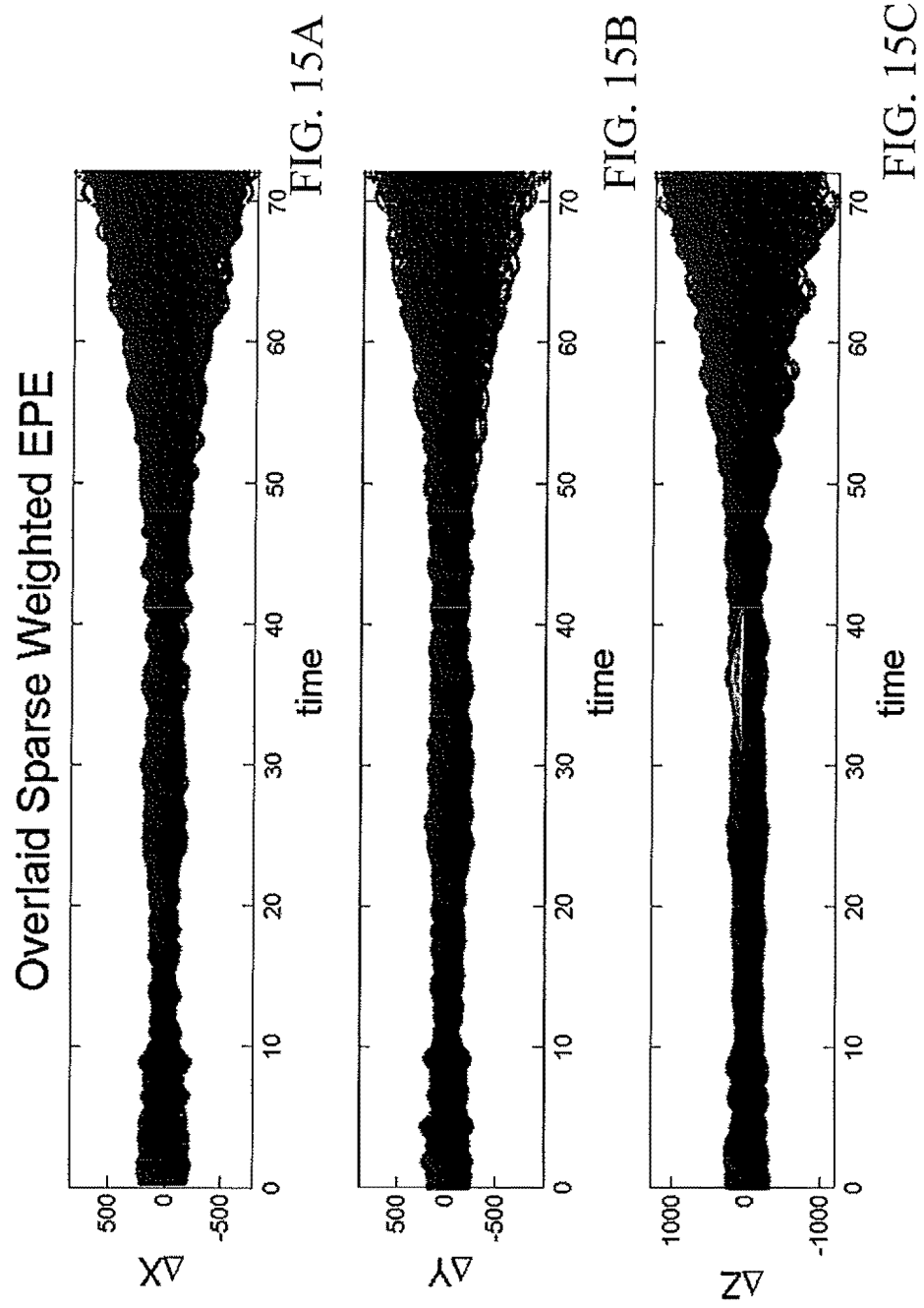
FIGS. 15A, 15B, and 15C are graphs of positional variation vs. time showing the overlaid error for the weighted EPEs generated with sparse measurements.

FIGS. 15A, 15B, and 15C depict positional error vs. time for the weighted EPEs generated with sparse measurements. The error remains in the range of ±200 m at TOE and raise to ±1000 m at TOE+72 hours error.

The combination of the error overlays and the long term RMS errors show conclusively that the generation of EPEs via sparse measurements spaced at ΔT=9000 sec can produce measurement precision of 10 meters, which is quite good.

Several studies were also performed on single cases of FE using new BE data update at TOE+24 hours and including the sparse measurements from TOE+24 hours to TOE+72 hours. This analysis was performed for both weighted and unweighted cases. Another set of single run analyses was also performed with new BE measurements at TOE+48 hours and sparse measurements from TOE+48 hours to TOE+72 hours. These analyses were also performed for both weighted and unweighted EPEs. The single case runs were done with data from week 1473.

Figure 16A:
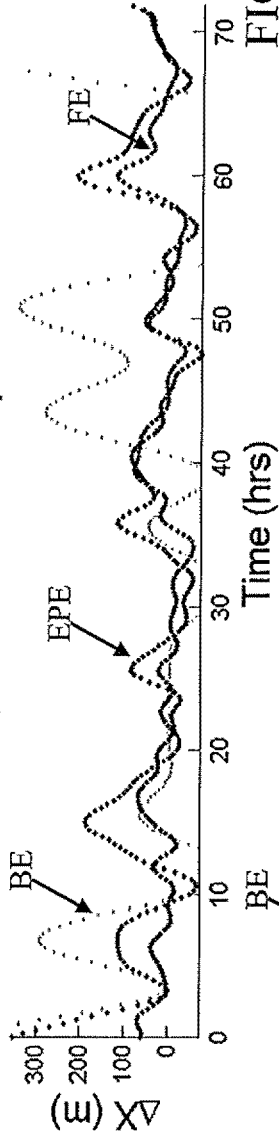
FIGS. 16A, 16B, and 16C are graphs of positional errors vs. time for a BE update fusion at TOE+24 hours and with sparse measurement fusion with unweighted EPE coefficients.
Figure 16B:
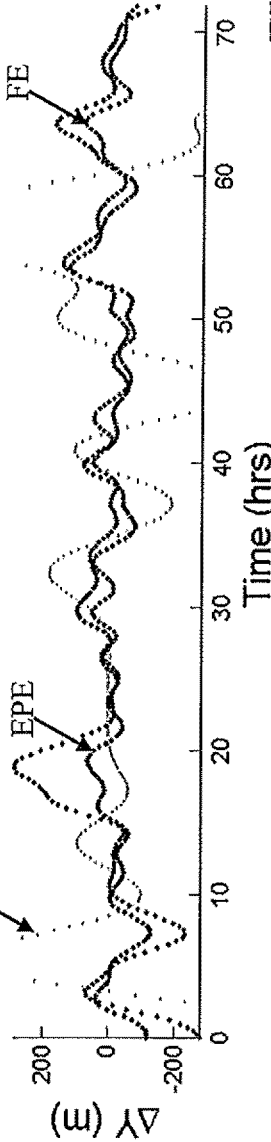
Figure 16C:
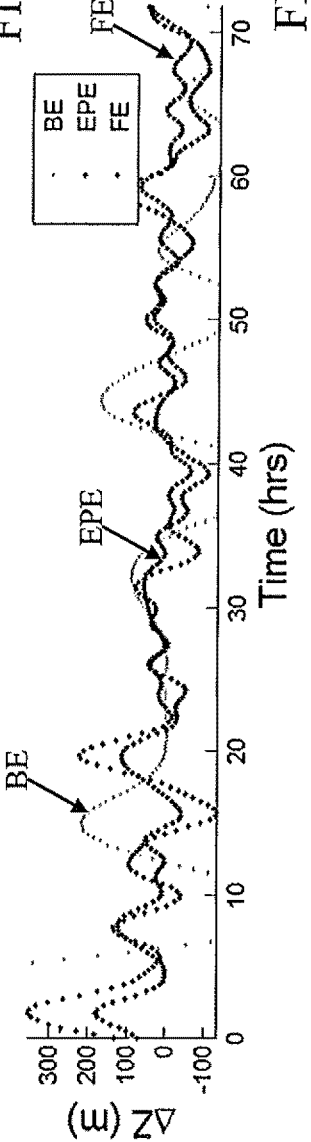

FIGS. 16A, 16B, and 16C depict positional errors vs. time for a BE update fusion at TOE+24 hours and with sparse measurement fusion with unweighted EPE coefficients. These figures show a marked reduction in error after 24 hours. Similar studies were performed for sparse measurements fusion and BE fusion at TOE+48 hours for unweighted EPE coefficients. Also, similar studies were performed as above for the weighted EPE coefficients (i.e., BE fusion at TOE+24 hours and TOE+48 hours). It is notable that when using the weighted EPE as a base the FE shows even more considerable improvement than for unweighted cases. From the single case measurement fusion examples examined it can be seen that using sparse measurements in conjunction with an update from BE measurements provides the results desired from measurement fusion. Furthermore it can be seen that using a weighted EPE as an initial formulation provides the most desirable combination of EPE, BE and sparse measurements.

A long term fusion with sparse measurements study was also performed with data collected starting at week 1199 day 3 to week 1227 for both weighted and unweighted EPE coefficients. Also, the FEs used are generated based on EPEs calculated using sparse measurements with ΔT=9000 sec and a measurement of precision of 10 m. While the long term RMS error plots are no shown, the RMS error for positional errors reduced as compared to RMS with only BE fusion. Comparing the methods described above (i.e., unweighted EPE model ('550 patent), weighted EPE model, BE-EPE fusion, BE-sparse measurement-unweighted-EPE fusion, and BE-sparse measurement-weighted-EPE fusion) shows that using measurement fusion with sparse measurements and a BE update at TOE+24 hours provides a substantial increase in accuracy over both weighted and unweighted EPEs.

Based on all of the analyses of different EPE and FE cases the following observations for implementation can be made. First, weighting EPEs appears to be beneficial by providing higher accuracy of positional estimation for situations where the receiver can receive updates. Second, weighting EPEs does not affect the success of measurement fusion therefore there is no apparent downside to using a weighted EPE as an initial starting point in the measurement fusion process. It was found that measurement fusion can successfully improve the accuracy of a model but only over the period where "update measurements" are available. Based on this observation it can be concluded that instead of transmitting EPE coefficients to a receiver raw, sparsely spaced, measurements with reduced precision should be sent so that they can be included in both the EPE and FE fits. It was found that measurements can be spaced up to about 9000 seconds for GPS satellites with a precision rounded to the nearest 10 meters if the EPE being used is from similar to the EPE model from the '550 patent with a fit length of 72 hours. Finally, the overall long term validity of this sparse measurement fusion method was analyzed using data from week 1199 to week 1227 and it was found that long term performance remains robust.

Implementation

Figure 17:
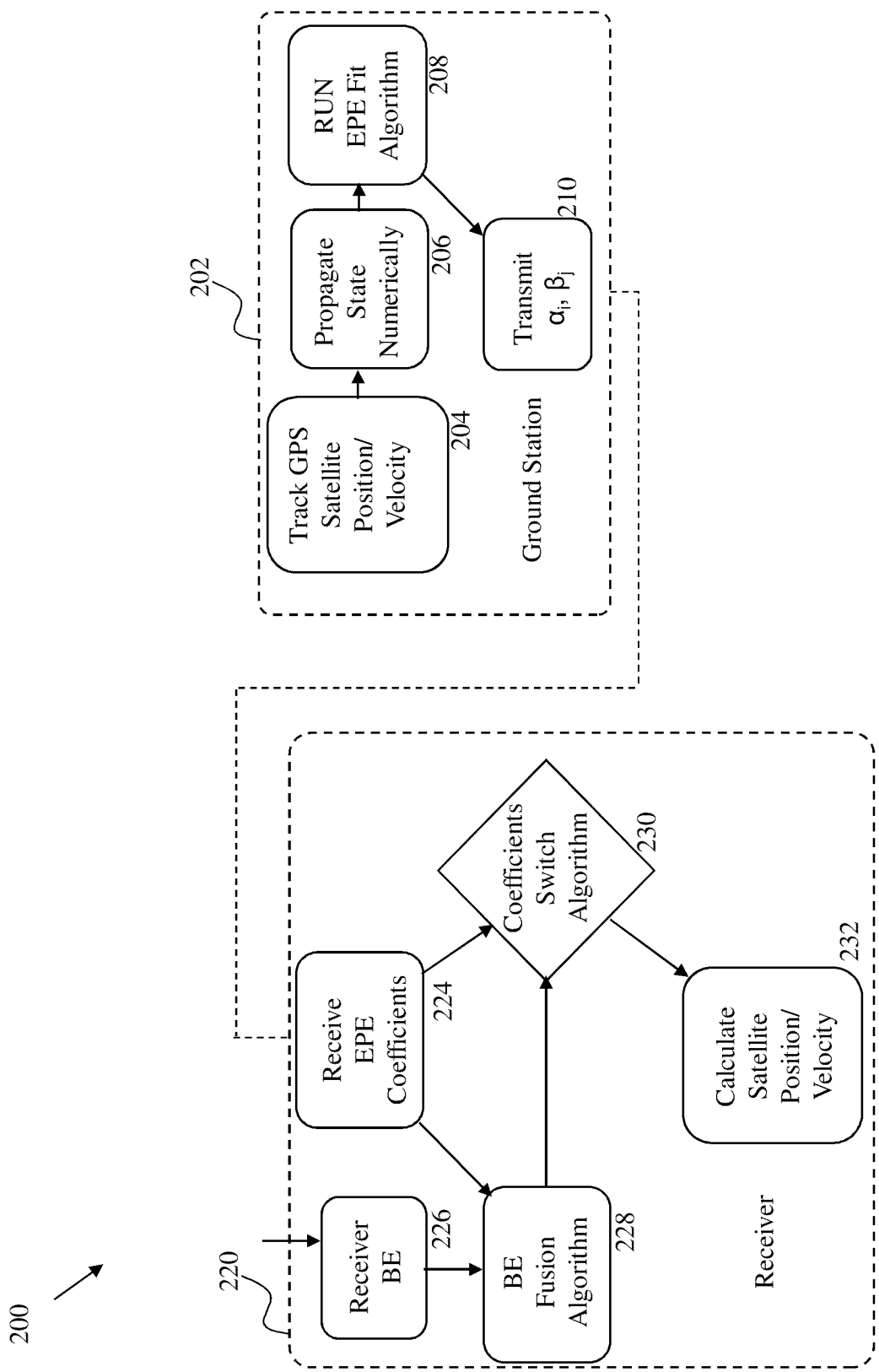
FIG. 17 is a schematic of a network including a ground station and a receiver, according to one embodiment of the present disclosure.

A schematic of a ground station 202 is provided in FIG. 17 as part of the network 200. These ground stations 202 track the position and velocity of the GPS satellites with high precision (block 204). The motion of the satellites is then propagated out for future times and fit to the osculating orbital element model defined by equation 1 (blocks 206 and 208). These parameters are then transmitted individually to each GPS satellite (block 210). The satellite then rebroadcasts these parameters at a low data rate on top of the GPS navigation signal.

A schematic of receiver 220 is also provided in FIG. 17 as part of the network 200. A time based model for the satellite motion is preprogrammed into the receiver based on a series of coefficients. These coefficients are transmitted to the receiver from the ground station 202 (block 224) or are overlaid on top of the ranging signal from the satellite. With the appropriate signal to noise ratio (27 dB-Hz), the receiver also receives broadcast ephemeris data from the satellite (block 226). The receiver would then generate a set of Fused Ephemeris coefficients (blocks 228 and 230). Using the fused ephemeris coefficients data the receiver can then estimate position of the satellite (block 232).

Figure 17A:
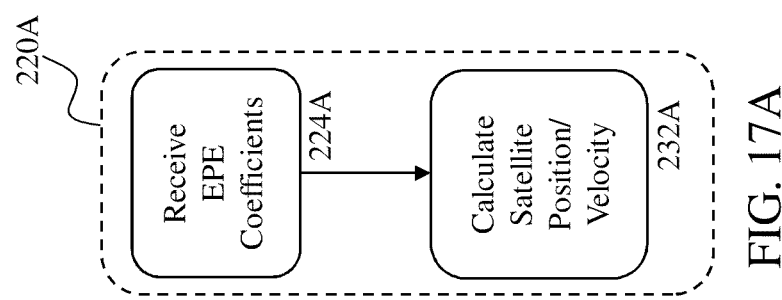
FIG. 17A is a schematic of the receiver according one embodiment of the present disclosure.

FIG. 17A depicts one variety of the receiver 220A according to the present disclosure. The receiver 220A, is configured to receive the EPE coefficients (block 224A) and estimate the satellite position (232A). The received EPE coefficients were determined by applying at least one least square fit to determine osculating term coefficients (equation 1) and harmonic perturbation coefficients of the RSW coordinate system (equation 4), including the dominant frequency of true anomaly ($\theta^*$).

Alternatively or in addition to the EPE coefficient characteristics, the EPE coefficients were determined by applying a weighting function. The weighting function was performed by replacing a covariance matrix resulting from the least square estimation by a weight matrix.

Figure 18:
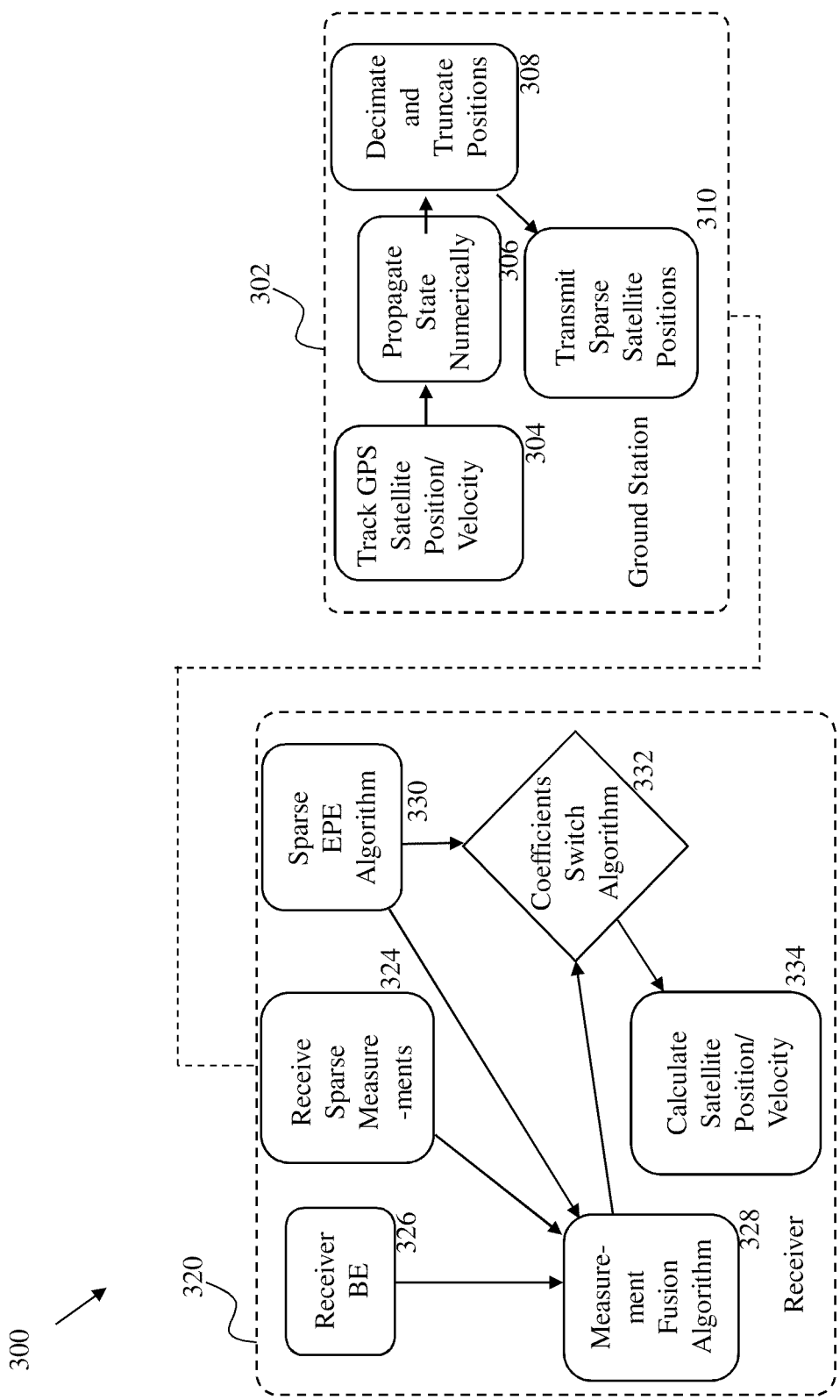
FIG. 18 is a schematic of a network including a ground station and a receiver, according to another embodiment of the present disclosure.

A ground station for a measurement fusion application would be responsible for a much smaller portion of the work load as compared to the ground stations in the current GPS network. FIG. 18 depicts a network 300 with a ground station 302 and a receiver 320 according to various embodiments of the present disclosure. One task that is assigned to the ground station that is needed for measurement fusion according to the present disclosure is GPS satellite tracking (block 304), position propagation (blocks 306 and 308), and a "one time" (per measurement) transmission of the data to a beacon transmitter (block 310).

The steps required for a ground station supporting BE fusion are listed below:

1—Measure satellite state position and velocity using a high-precision orbit determination program or collect online data (e.g., IGS);
2—Using a high accuracy numerical propagator calculate satellite state over next 72 hours.
3—Estimate EPE coefficients using a least squares batch filter. Use at least one least square filter to calculate $\beta_1$ through $\beta_{23}$ coefficients of the osculating orbital elements, $\alpha_1$ through $\alpha_{10}$ of the harmonic perturbation terms of an RSW coordinate system, dominant frequency of the true anomaly, and apply a Fourier transformation to determine dominant frequencies of the RSW frequencies (i.e., $f_{R1}$, $f_{R2}$, $f_{S1}$, $f_{S2}$, and $f_W$), see equations 1 and 4.
4—Replace the data covariance matrix of the estimator of step 3 with the weight matrix:

$$R^{-1} = \begin{bmatrix} W(t) & 0 & 0 \\ 0 & W(t) & 0 \\ 0 & 0 & W(t) \end{bmatrix}$$

Where $W(t)=1-t/T_P$ and Tp is the period of the EPE, and
5—Transmit results of fit parameters and covariance matrix to receiver.

The steps required for a ground station supporting measurement fusion are outlined below:

1—Measure satellite position and velocity using a high-precision orbit determination program or collect online data (e.g., IGS);
2—Using a high accuracy numerical propagator calculate satellite state over an extended period;
3—"One time" transmission of position data to other transmitters.

The ground station according to the present disclosure is not in direct communication with either the GPS satellite or the receiver. Instead the ground station connects with a beacon device at a rate of one time per measurement. Also, instead of sending a set of coefficients for the EPE orbit model, the ground station of the present disclosure is configured to transmit raw measurements with reduced precision spaced by approximately 9000 seconds.

The beacon style transmitter would be an integral part of the network required to support measurement fusion. The beacon would be required to periodically connect with ground stations and download new GPS satellite position measurements. Then it would continuously rebroadcast these measurements along with the associated time stamp.

The receiver 320 is configured to receive a set of sparse measurements from the ground station 302 (block 324) as well as BE data from the satellite (block 326). The receiver runs an estimator for its orbit model (block 332) based on the new measurements and BE data (blocks 328 and 330) and any old measurements that are still valid. Then receiver can then estimate the satellite's position based on the new orbital model (block 334).

One advantage of the measurement fusion approach is that the period of validity of the model coefficients is flexible. Therefore, after certain measurements are no longer of use the measurements can be discarded and the orbit model coefficients can be recalculated. Another advantage is that the model can be changed and the estimator can be updated as better models and estimators are developed. Another advantage is that the receiver can use measurements generated from the GNSS satellite's broadcast navigation message and use that data in combination with measurements received from the ground to calculate coefficients for an accurate longer term model.

The steps required for a receiver supporting BE fusion are listed below:

1—Receive EPE variables from ground station and store coefficients in receiver memory.
2—If at an unspecified time, the GPS signal is received with sufficient strength, download the coefficients associated with the BE data.
3—Use BE elements to generate equally spaced position solutions which space the period of applicability of the BE.
4—Initialize a least squares estimator (un-weighted) with apriori information (from receiver step 1) and new measurements (from receiver step 3). Store new FE ($\beta_{FE}$, $\alpha_{FE}$) parameters.
5—If a FE has been generated run EPE position algorithm with $\beta_{FE}$, $\alpha_{FE}$. If FE has not been generated run EPE position algorithm with $\beta_{EPE}$, $\alpha_{EPE}$.

The steps required for a receiver supporting measurement fusion are listed below:

1—Receive position estimates $X_i$, $Y_i$, $Z_i$ and reference epoch TOE from beacon transmitter.
2—Setup weighting function:

$$w(t)=1-(t_k-\text{TOE})/T_1,$$

where $T_1$ is the length of the ephemeris fit and $t_k$ is the time since beginning of week.
3—Run receiver's on board least squares estimator (with weighting) to fit received positions to orbit model.
4—If, at some unspecified time, the GPS signal is received with sufficient strength, download BE coefficients.
5—Use BE elements to generate equally spaced position solutions which span the window of applicability of the BE.
6—Initialize a least squares estimator (un-weighted) with apriori information from original fit, using measurements from BE and any stored position estimates for future times. This will achieved "Fused" ephemeris model.
7—Store the new FE parameters $\beta_{FE}$ and $\alpha_{FE}$.
8—Use basic logic to select between original and fused coefficients.

The EPE position algorithm are based on the following steps:
1—Calculate time into ephemeris.

$$t_k=\text{TOW}-\text{TOE}$$

2—Calculate osculating orbital elements using $t_k$ and $\beta$ coefficients (see equation 1).
3—Calculate perturbation terms in RSW frame using $t_k$ and $\alpha$ coefficients (see equation 4).
4—Calculate satellite radius from osculating elements:

$$r = \frac{a(1-e^2)}{1+e\cos\theta^*}$$

5—Perform reference frame calculation from RSW to Earth Centered Inertial (ECI) frame as outlined below:

$$X_{ECI}=h_{11}(r+\delta r)+h_{12}\delta s+h_{13}\delta\omega$$

$$Y_{ECI}=h_{21}(r+\delta r)+h_{22}\delta s+h_{23}\delta\omega$$

$$Z_{ECI}=h_{31}(r+\delta r)+h_{32}\delta s+h_{33}\delta\omega,$$

wherein $h_{11}$, $h_{12}$, $h_{13}$, $h_{21}$, $h_{22}$, $h_{23}$, $h_{31}$, $h_{32}$, $h_{33}$ are based on equations:

$$h_{11}=\cos\Omega\cos\theta-\sin\Omega\cos i\sin\theta$$

$$h_{12}=-\cos\Omega\sin\theta-\sin\Omega\cos i\cos\theta$$

$$h_{13}=\sin\Omega\sin i$$

$$h_{21}=\sin\Omega\cos\theta-\cos\Omega\cos i\sin\theta$$

$$h_{22}=-\sin\Omega\sin\theta+\cos\Omega\cos i\cos\theta$$

$$h_{23}=-\cos\Omega\sin i$$

$$h_{31}=\sin i\sin\theta$$

$$h_{32}=\sin i\cos\theta$$

$$h_{33}=\cos i.$$

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for providing an extended propagation ephemeris model for a satellite in Earth orbit comprising:
    obtaining within a ground station data associated with a satellite's orbital position over a first period of time;
    calculating within the ground station, from the data, coefficients defining osculating Keplarian orbital elements and harmonic perturbation parameters associated with a coordinate system defining an extended propagation ephemeris model that can be used to estimate the satellite's position during the first period;
    applying a Fourier transform to data derived from the calculated coefficients to determine dominant frequencies of the harmonic perturbation parameters;
    weighting the extended propagation ephemeris model according to a weighing function so that the extended propagation ephemeris model generates a highest level of accuracy at a beginning of the first period; and
    providing the weighted extended propagation ephemeris to a receiver.

2. The method of claim 1, calculating coefficients further comprising:
    applying a first least square estimation filter to the data associated with the satellite's orbital position to determine 23β coefficients defining osculating Keplarian orbital elements, wherein the osculating Keplarian orbital elements include semi-major axis of the satellite (a), eccentricity of the satellite (e), inclination of the satellite (i), right ascension of ascending node of the satellite ($\Omega$), true anomaly ($\theta^*$), and argument of periapsis ($\omega$) based on equations:

$$a=\beta_1+\beta_2\theta+\beta_3\cos(2\theta)+\beta_4\sin(2\theta)$$

$$e=\beta_5+\beta_6\theta+\beta_7\cos(\theta)+\beta_8\sin(\theta)+\beta_9\cos(3\theta)+\beta_{10}\sin(3\theta)$$

$$i=\beta_{11}+\beta_{12}\theta+\beta_{13}\cos(2\theta)+\beta_{14}\sin(2\theta)$$

$$\Omega=\beta_{15}+\beta_{16}\theta+\beta_{17}\cos(2\theta)+\beta_{18}\sin(2\theta)$$

$$\theta^*=\beta_{19}+\beta_{20}t_k+\beta_{21}\cos(2\pi f_{\theta^*}t_k)+\beta_{22}\sin(2\pi f_{\theta^*}t_k)$$

$$\omega=\beta_{23},$$

wherein $t_k$ is based on equation:

$$t_k=t_{ow}-t_{oe},$$

wherein $t_{ow}$ is time from beginning of week and $t_{oe}$ is time of ephemeris, and $\theta$ is a time series of arguments of latitude for the satellite's orbital positions based on equation:

$$\theta=\theta^*+\omega;$$

applying the first least square estimation filter to the data associated with the satellite's orbital position to determine a dominant frequency of the true anomaly;
applying a second least square estimation filter to the data associated with the satellite's orbital position to determine 10 α coefficients defining harmonic perturbation parameters based on equations:

$$\delta r=\alpha_1\cos(2\pi f_{r1}t)+\alpha_2\sin(2\pi f_{r1}t)+\alpha_3\cos(2\pi f_{r2}t)+\alpha_4\sin(2\pi f_{r2}t)$$

$$\delta s=\alpha_5\cos(2\pi f_{s1}t)+\alpha_6\sin(2\pi f_{s1}t)+\alpha_7\cos(2\pi f_{s2}t)+\alpha_8\sin(2\pi f_{s2}t)$$

$$\delta w=\alpha_9\cos(2\pi f_w t)+\alpha_{10}\sin(2\pi f_w t); \text{ and}$$

applying a discrete Fourier transform to data derived from the calculated coefficients to determine the dominant frequencies for frequency terms $f_{r1}$, $f_{r2}$, $f_{s1}$, $f_{s2}$, and $f_w$.

3. The method of claim 2, weighting the extended propagation ephemeris model further comprising:
    replacing a data covariance matrix resulting from applying the first and the second least square estimation filters with a weighting matrix based on:

$$R^{-1}=\begin{bmatrix} W(t) & 0 & 0 \\ 0 & W(t) & 0 \\ 0 & 0 & W(t) \end{bmatrix},$$

wherein W(t) is defined based on equation:

$$W(t)=1-t/T_P,$$

wherein $T_P$ is length of the first period.

4. A method for estimating position of a satellite based on an extended propagated ephemeris model, comprising:
    storing data associated with an extended propagated ephemeris model in a memory in a receiver, wherein the model can be used to estimate position of a satellite for a first period of time;
    receiving a broadcast ephemeris data from the satellite by the receiver, wherein the broadcast ephemeris data can be used to estimate position of the satellite for a second period of time; and
    fusing the data associated with the extended propagated ephemeris model stored in the memory with the broadcast ephemeris data by a processor onboard the receiver, wherein position of the satellite can be estimated based on the fused data of the extended propagated ephemeris model and the broadcast ephemeris data.

5. The method of claim 4, wherein the data associated with the extended propagated ephemeris model is received by the receiver from a ground station.

6. The method of claim 4, wherein the data associated with the extended propagated ephemeris model is calculated by the receiver based on orbital position data of the satellite received by the receiver from a ground station.

7. The method of claim 4, wherein the data associated with the extended propagation ephemeris model includes:

23$\beta$ coefficients defining osculating Keplarian orbital elements, wherein the osculating Keplarian orbital elements include semi-major axis of the satellite (a), eccentricity of the satellite (e), inclination of the satellite (i), longitude of the ascending node of the satellite ($\Omega$), true anomaly ($\theta^*$), and argument of periapsis ($\omega$) based on equations:

$a = \beta_1 + \beta_2\theta + \beta_3 \cos(2\theta) + \beta_4 \sin(2\theta)$ $e = \beta_5 + \beta_6\theta + \beta_7 \cos(\theta) + \beta_8 \sin(3\theta) + \beta_9 \cos(3\theta) + \beta_{10} \sin(3\theta)$ $i = \beta_{11} + \beta_{12}\theta + \beta_{13} \cos(2\theta) + \beta_{14} \sin(2\theta)$ $\Omega = \beta_{15} + \beta_{16}\theta + \beta_{17} \sin(2\theta) + \beta_{18} \sin(2\theta)$ $\theta^* = \beta_{19} + \beta_{20}t_k + \beta_{21} \cos(2\pi f_{\theta^*} t_k) + \beta_{22} \sin(2\pi f_{\theta^*} t_k)$ $\omega = \beta_{23}$, wherein $t_k$ is based on equation:

$t_k = t_{ow} - t_{oe}$, wherein $t_{ow}$ is time from beginning of week and $t_{oe}$ is time of ephemeris, and $\theta$ is a time series of arguments of latitude for the satellite's orbital positions based on equation:

$\theta = \theta^* + \omega$;

a dominant frequency of the true anomaly;

10 $\alpha$ coefficients defining harmonic perturbation parameters based on equations:

$\delta r = \alpha_1 \cos(2\pi f_{r1} t) + \alpha_2 \sin(2\pi f_{r1} t) + \alpha_3 \cos(2\pi f_{r2} t) + \alpha_4 \sin(2\pi f_{r2} t)$ $\delta s = \alpha_5 \cos(2\pi f_{s1} t) + \alpha_6 \sin(2\pi f_{s1} t) + \alpha_7 \cos(2\pi f_{s2} t) + \alpha_8 \sin(2\pi f_{s2} t)$ $\delta w = \alpha_9 \cos(2\pi f_w t) + \alpha_{10} \sin(2\pi f_w t)$; and dominant frequencies for frequency terms $f_{r1}$, $f_{r2}$, $f_{s1}$, $f_{s2}$, and $f_w$.

8. The method of claim 7, fusing the data associated with the extended propagated ephemeris model with the broadcast ephemeris data further comprising:

applying a first least square estimation filter to update the 23$\beta$ coefficients defining the osculating Keplarian orbital elements, the dominant frequency of the true anomaly, and the 10$\alpha$ coefficients defining the harmonic perturbation parameters.

9. The method of claim 7, further comprising:

receiving sparse measurements from a ground station defining the satellite's orbital position; and applying a least square estimation filter to update the 23$\beta$ coefficients defining the osculating Keplarian orbital elements, the dominant frequency of the true anomaly, and the 10$\alpha$ coefficients defining the harmonic perturbation parameters.

10. The method of claim 8, further comprising:

receiving sparse measurements from a ground station defining the satellite's orbital position; and applying the first least square estimation filter to update the 23$\beta$ coefficients defining the osculating Keplarian orbital elements, the dominant frequency of the true anomaly, and the 10$\alpha$ coefficients defining the harmonic perturbation parameters.

11. A method for providing an extended propagation ephemeris model for a satellite in Earth orbit comprising:

receiving from a ground station at a receiver data associated with a satellite's orbital position over a first period of time;

calculating within the receiver, from the data, coefficients defining osculating Keplarian orbital elements and harmonic perturbation parameters associated with a coordinate system defining an extended propagation ephemeris model that can be used to estimate the satellite's position during the first period;

applying a Fourier transform to data derived from the calculated coefficients to determine dominant frequencies of the harmonic perturbation parameters;

weighting the extended propagation ephemeris model according to a weighing function so that the extended propagation ephemeris model generates a highest level of accuracy at a beginning of the first period; and storing the weighted extended propagation ephemeris in a memory at the receiver.

* * * * *